US011906202B2

(12) United States Patent
Kim et al.

(10) Patent No.: US 11,906,202 B2
(45) Date of Patent: *Feb. 20, 2024

(54) ENERGY STORAGE SYSTEMS

(71) Applicant: Higher Dimension Materials, Inc., St. Paul, MN (US)

(72) Inventors: Young-Hwa Kim, Hudson, WI (US); Richard Dale Olmsted, Vadnais Heights, MN (US); Thomas P. Lorenz, Jr., Minneapolis, MN (US)

(73) Assignee: Higher Dimension Materials, Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/110,145

(22) Filed: Feb. 15, 2023

(65) Prior Publication Data

US 2023/0417452 A1    Dec. 28, 2023

Related U.S. Application Data

(63) Continuation of application No. 17/852,014, filed on Jun. 28, 2022, now Pat. No. 11,585,571.

(51) Int. Cl.
*F24H 7/06* (2006.01)
*F28D 20/02* (2006.01)
*H02J 15/00* (2006.01)

(52) U.S. Cl.
CPC ........... *F24H 7/062* (2013.01); *F28D 20/021* (2013.01); *F28D 20/028* (2013.01); *H02J 15/007* (2020.01); *H02J 2300/20* (2020.01)

(58) Field of Classification Search
CPC ...... F24H 7/062; F28D 20/021; F28D 20/028; H02J 15/007; H02J 2300/20
See application file for complete search history.

(56) References Cited

U.S. PATENT DOCUMENTS

| | | | |
|---|---|---|---|
| 7,425,807 | B1 | 9/2008 | Perkins et al. |
| 10,012,113 | B2 | 7/2018 | Vamvas |

(Continued)

FOREIGN PATENT DOCUMENTS

| | | |
|---|---|---|
| CN | 113465432 | 10/2021 |
| DE | 102015111235 | 9/2016 |

(Continued)

OTHER PUBLICATIONS

International Search Report and Written Opinion in International Appln. No. PCT/US2022/35254, dated Oct. 26, 2022, 10 pages.

(Continued)

*Primary Examiner* — Carlos Amaya
(74) *Attorney, Agent, or Firm* — Fish & Richardson P.C.

(57) ABSTRACT

Heat energy storage systems described in this disclosure can be used for long-term storage of large amounts of thermal energy. In some cases, such systems receive electrical energy from renewable energy sources such as solar panels or wind turbines. Using novel techniques, the heat energy storage systems covert the electrical energy to thermal energy that is stored in hot materials such as molten silicon, molten salts, or any other material that can store large amounts of heat. The heat energy storage systems incorporate extremely good thermal insulation of the thermal energy storage tank that contains the hot materials. The systems are also configured to release thermal energy in an efficient manner to an electricity-producing steam turbine using novel heat exchanger systems and techniques that are described. The energy storage systems described herein have a higher overall real-world efficiency than energy storage systems currently available.

18 Claims, 25 Drawing Sheets

(56) References Cited

U.S. PATENT DOCUMENTS

| | | |
|---|---|---|
| 11,451,112 B2 | 9/2022 | Kim et al. |
| 11,585,571 B1 * | 2/2023 | Kim .................. F24H 7/062 |
| 2006/0059937 A1 | 3/2006 | Perkins et al. |
| 2011/0114406 A1 | 5/2011 | Gibson et al. |
| 2011/0219771 A1 | 9/2011 | Stiesdal |
| 2011/0263384 A1 | 10/2011 | Drazan |
| 2013/0241203 A1 | 9/2013 | Kleen et al. |
| 2014/0093757 A1 | 4/2014 | Sakai et al. |
| 2015/0167489 A1 | 6/2015 | Heiligenstein et al. |
| 2015/0308410 A1 | 10/2015 | Goldstein |
| 2017/0201113 A1 | 7/2017 | Gazit |
| 2019/0017443 A1 | 1/2019 | Eifert |
| 2020/0132393 A1 | 4/2020 | Phillips et al. |
| 2022/0166287 A1 | 5/2022 | Kim et al. |

FOREIGN PATENT DOCUMENTS

| | | |
|---|---|---|
| WO | WO 2018215808 | 11/2018 |
| WO | WO 2020244809 | 12/2020 |

OTHER PUBLICATIONS

International Search Report and Written Opinion in International Appln. No. PCT/US2021/059871, dated Feb. 9, 2022, 11 pages.

* cited by examiner

ENERGY STORAGE SYSTEMS

CROSS-REFERENCE TO RELATED APPLICATIONS

This application claims the benefit of U.S. application Ser. No. 17/852,014 filed Jun. 28, 2022 (U.S. Pat. No. 11,585, 571). The disclosure of the prior application is considered part of (and is incorporated by reference in) the disclosure of this application.

BACKGROUND

1. Technical Field

This disclosure relates to novel energy storage systems for long-term energy storage. This disclosure also relates to the integration of such energy storage systems with renewable energy sources (e.g., solar energy and wind energy), flywheel energy storage systems (optionally), and steam pressure regulating systems that feed an electricity-producing steam turbine.

2. Background Information

The Earth receives energy from the Sun that is more than 10,000 times the energy that all humans on the Earth consume. Wind energy is a derivative of the energy from the Sun. Yet, energy-hungry societies depend mostly on energy from burning fossil fuels. There is strong international pressure to reduce the consumption of fossil fuels and to switch to renewable energy sources such as solar or wind power.

The cost of renewable energy is now roughly equal to or lower than the cost of energy generated by fossil fuels. However, a serious challenge of renewable energy is that electricity generated by solar panels and wind turbines cannot be stored economically for long periods of time. This boils down to the need for long-term economic methods of storing large amounts of the energy from the Sun.

There are varieties of different energy storage systems ("ESS") currently available. The major types of ESS are battery energy storage systems, flywheel energy storage systems, heat energy storage systems ("HESS") such as molten salt energy storage systems, compressed air energy storage systems, and gravity energy storage systems. Each of these ESS has characteristic advantages and disadvantages. However, as this disclosure shows, a novel integration of such storage systems, along with novel techniques for insulating HESS solves problems that are not solved by such stand-alone systems.

SUMMARY

This disclosure describes novel HESS for long-term storage of large amounts of thermal energy in hot materials. In some cases, such HESS receives electrical energy from renewable energy sources such as solar panels or wind turbines. Using novel techniques described below, the HESS converts the electrical energy to thermal energy that is stored in hot materials such as molten silicon or molten salts. The HESS described herein incorporate extremely good thermal insulation of the thermal energy storage tank that contains the hot materials. Accordingly, the thermal energy storage is highly efficient. The HESS is also configured to release its thermal energy in an efficient manner to an electricity-producing steam turbine using novel heat exchanger systems and techniques that are described below. Accordingly, when the HESS described below is integrated with an energy source (e.g., a renewable energy source), a steam turbine electricity generator system, and one or more flywheel energy storage systems (optionally), the HESS can provide highly efficient energy receipt, storage, and delivery. This type of HESS can greatly enhance the practical viability of renewable energy sources such as wind and solar.

In one aspect, this disclosure is directed to an energy storage system ("ESS") that includes a vacuum chamber and a thermal energy storage tank located within the vacuum chamber. The thermal energy storage tank includes one or more walls that define: (i) an enclosed interior space and (ii) a plurality of open spaces extending within the enclosed interior space. The ESS also includes a thermal energy storage medium located within the enclosed interior space; a first heating device disposed in a first open space of the plurality of open spaces; and a radiant barrier disposed over exterior surfaces of the one or more walls of the thermal energy storage tank. A first portion of the radiant barrier is disposed between: (a) the one or more walls that define the first open space and (b) the first heating device. The ESS also includes a first actuator system coupled the first portion of the radiant barrier. The first actuator system is operable to increase a radiative heat transfer from the first heating device to the thermal energy storage medium by at least partially removing the first portion of the radiant barrier from being between the one or more walls that define the first open space and the first heating device.

Such an ESS may optionally include one or more of the following features. The radiant barrier may include multiple sheets of material that are spaced apart from the one or more walls and that are spaced apart from each other. The ESS may also include spacer members disposed between at least some of the multiple sheets of material such that the multiple sheets of material are spaced apart from each other. In some embodiments, the spacer members comprise multiple separate portions that are stacked on each other. The ESS may also include a heating reservoir configured to contain a fluid. The heating reservoir may be disposed in a second open space of the plurality of open spaces. The ESS may also include a second actuator system coupled to a second portion of the radiant barrier that is disposed between: (i) the one or more walls that define the second open space and (ii) the heating reservoir. The second actuator system may be operable to increase a radiative heat transfer from the thermal energy storage medium to the fluid contained in the heating reservoir by at least partially removing the second portion of the radiant barrier from being between the one or more walls that define the second open space and the heating reservoir. The energy plurality of open spaces extending within the enclosed interior space may include at least two open spaces. The ESS may also include at least one additional heating device in addition to the first heating device. Each additional heating device may be disposed in a respective open space of the plurality of open spaces. A horizontal cross-section of the thermal energy storage tank may have an outer profile that is circular or polygonal. The thermal energy storage medium may comprise salt or silicon. The first heating device may comprise a resistive heating element. Portions of the radiant barrier that are not disposed over the one or more walls that define the plurality of open spaces may be configured to be stationary in relation to the thermal energy storage tank. The radiant barrier may include at least two sheets of material that are spaced apart from the one or more walls and that are spaced apart from each other.

In another aspect, this disclosure is directed to a method of storing energy. The method includes delivering electrical energy to one or more resistive heating devices that are each disposed in a respective open space of a plurality of open spaces defined by a thermal energy storage tank located within a vacuum chamber. The thermal energy storage tank also defines an enclosed interior space containing a thermal energy storage medium. The plurality of open spaces extend within the enclosed interior space. A radiant barrier is disposed over exterior surfaces of the thermal energy storage tank. The method also includes moving one or more portions of the radiant barrier at least partially out of the respective open spaces to increase a radiative heat transfer from the one or more resistive heating devices to the thermal energy storage medium.

Such a method may optionally include one or more of the following features. The method may also include, after the delivering electrical energy to one or more resistive heating devices, moving the one or more portions of the radiant barrier back into the respective open spaces to decrease a radiative heat transfer away from the thermal energy storage medium. The method may also include delivering a fluid to a heating reservoir disposed in an additional open space of the plurality of open spaces defined by the thermal energy storage tank. The method may also include moving an additional portion of the radiant barrier at least partially out of the additional open space to increase a radiative heat transfer from the thermal energy storage medium to the fluid. The method may also include, after heating the fluid by the radiative heat transfer from the thermal energy storage medium, moving the additional portion of the radiant barrier back into the additional open space to decrease a radiative heat transfer away from the thermal energy storage medium.

Particular embodiments of the subject matter described in this document can be implemented to realize one or more of the following advantages. The HESS described herein maximize the density of thermal energy per unit weight and per volume by maximally utilizing physical principles of vacuum thermal insulation that essentially eliminates heat losses due to conventional insulation systems. The HESS incorporate novel heat exchange systems and techniques between resistive heating devices and the thermal energy storage medium, as well as between the thermal energy storage medium and a heating reservoir of a working fluid of a heat engine. Such systems and techniques enhance the efficiency of the radiative heat transfer process while such processes take place, and minimize the heat losses and inefficiencies when the processes are completed.

Further, the HESS described herein are advantageously designed to include structural support members that are optimized to reduce heat losses due to conduction. Moreover, the HESS described herein include highly-effective radiant barriers that virtually eliminate heat losses due to radiation. Accordingly, the efficiency and storage time of the HESS described herein is greatly enhanced in comparison to such systems known to date.

The performance of the HESS described herein does not decline no matter how frequently it is charged and discharged with energy for over many years (e.g., 20 years or more). In contrast, the performance of widely used battery ESS gradually decline each year, and the service life is only about 5 years to 8 years on average. The HESS described herein are alternative energy storage systems that can replace certain current applications of battery-based energy storage systems (e.g., lithium battery energy storage systems) as a more economically viable and more environmentally friendly large scale and long-term system for storing energy from renewable energy sources.

The HESS described herein provide long-term and low-cost storage of renewable energy harvested from solar panels, wind turbines, and/or other forms of renewable energy devices. In this context, "long-term" means many days or many weeks of time. "Low-cost" means an initial capital cost of storage per kilowatt-hour (kWh) that is significantly lower than cost of storage per kWh by modern, commercially available flywheel energy storage systems (FESS) and other conventional ESS such as lithium battery ESS that are widely used in the renewable energy industry. Moreover, the over-all efficiency of the HESS described herein improves as the amount of energy storage capacity becomes larger.

In addition, the HESS described herein can provide large-scale energy storage of renewable energy without using environmentally and biologically harmful materials. In addition, the HESS only occupies a small area of land.

The HESS described herein can also be used to reduce the heavy dependence of power-hungry societies on energy generated by burning fossil fuels.

Unless otherwise defined, all technical and scientific terms used herein have the same meaning as commonly understood by one of ordinary skill in the art to which this disclosure pertains. In addition, the materials, methods, and examples of the embodiments described herein are illustrative only and not intended to be limiting.

The details of one or more embodiments of the invention are set forth in the accompanying drawings and the description herein. The scope and applicability the HESS described herein is/are not limited by any of the particular numbers that are mentioned in this disclosure. Other features, objects, and advantages of the invention will be apparent from the description and drawings, and from the claims.

BRIEF DESCRIPTION OF THE DRAWINGS

Like reference numbers represent corresponding parts throughout.

DETAILED DESCRIPTION

This disclosure describes novel HESS for long-term storage of large amounts of thermal energy in hot materials at a temperature range of, for example, about 200° C. to 1,500° C. In some cases, such HESS receives electrical energy from renewable energy sources such as solar panels or wind turbines. Using novel techniques described below, the HESS converts the electrical energy to thermal energy that is stored in hot materials such as molten silicon, molten salts, or any of a variety of materials that can store large quantities of heat within a thermal energy storage tank of the HESS. The HESS described herein incorporate extremely good thermal insulation of the thermal energy storage tank that contains the hot materials. Provisions are included to minimize all forms of potential heat loss. Accordingly, the thermal energy storage is highly efficient.

The HESS is also configured to release its thermal energy in an efficient manner to the working fluid of an electricity-producing steam turbine using novel heat exchanger systems and techniques that are described below. Accordingly, when the HESS described below is integrated with an energy source (e.g., a renewable energy source), a steam turbine electricity generator system, and flywheel energy storage systems ("FESS") (optionally), the HESS can provide highly efficient energy receipt, storage, and delivery. This type of HESS can greatly enhance the practical viability of renewable energy sources such as wind and solar. For example, the HESS described herein can be advantageously integrated into broader systems of energy management, such as the hybrid energy storage systems described in U.S. patent application Ser. No. 17/530,219 filed on Nov. 18, 2021. In particular, the HESS described herein can be integrated into the disclosed hybrid energy storage systems by substituting the HESS for the molten salt energy storage system (e.g., reference number 120) that is a subsystem of the overall hybrid energy storage systems described therein. Integrating the HESS described herein in such a hybrid energy storage system provides a novel system that includes a hot body energy storage system, a steam temperature regulating system, a steam turbine system, and a FESS as an optional fourth subsystem. Such a hybrid energy storage system provides long-term storage of large amounts of energy received from solar and/or wind energy sources, and long-term continuous delivery of electricity to users when the electricity generated from the solar and/or wind energy sources is unavailable or interrupted due to causes such as day-and-night cycles, daily changes of weather, long periods of unfavorable weather such as several days of rains in summer and snowstorms in winter, or abrupt failures of the power grid of a city, building(s), a campus, and the like. Accordingly, U.S. patent application Ser. No. 17/530,219 is hereby incorporated by reference in its entirety and for all purposes.

Figure 1:
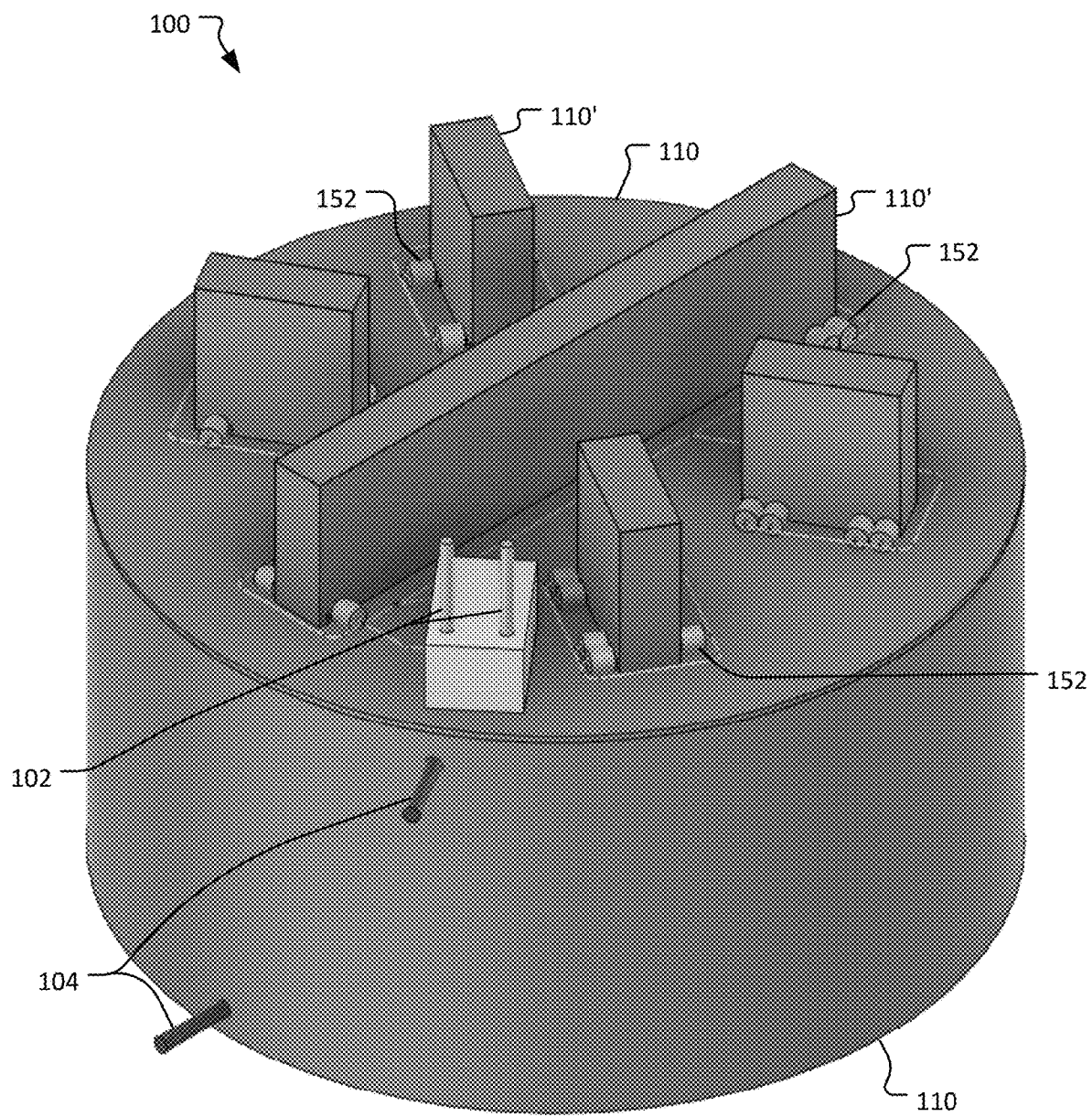
FIG. 1 is a perspective view of an example HESS in accordance with some embodiments described herein.

FIG. 1 depicts an example heat energy storage system 100 (or HESS 100). The HESS 100 includes a vacuum chamber 110. Extending through the walls of the vacuum chamber 110 are electrical connections 102 and working fluid connections 104, which will be described in detail below. Additionally, multiple actuator motors 152 are visible, which will also be described in detail below.

In this view of the HESS 100, essentially only the exterior wall surfaces of the vacuum chamber 110 are visible. The interior components of the HESS 100 are depicted in the following figures.

The HESS 100 includes the vacuum chamber 110 in order to enhance the thermal insulation of the HESS 100. That is, the vacuum within the vacuum chamber 110 serves to reduce energy (heat) losses that could otherwise occur due to convective and conductive heat transfer.

The HESS 100 is scalable to essentially any desired size. For example, in some embodiments the outer diameter of the HESS 100 ranges from 5 feet to 20 feet, or 10 feet to 30 feet, or 20 feet to 40 feet, or 30 feet to 50 feet, or 40 feet to 60 feet, or more, without limitation.

Figure 2:
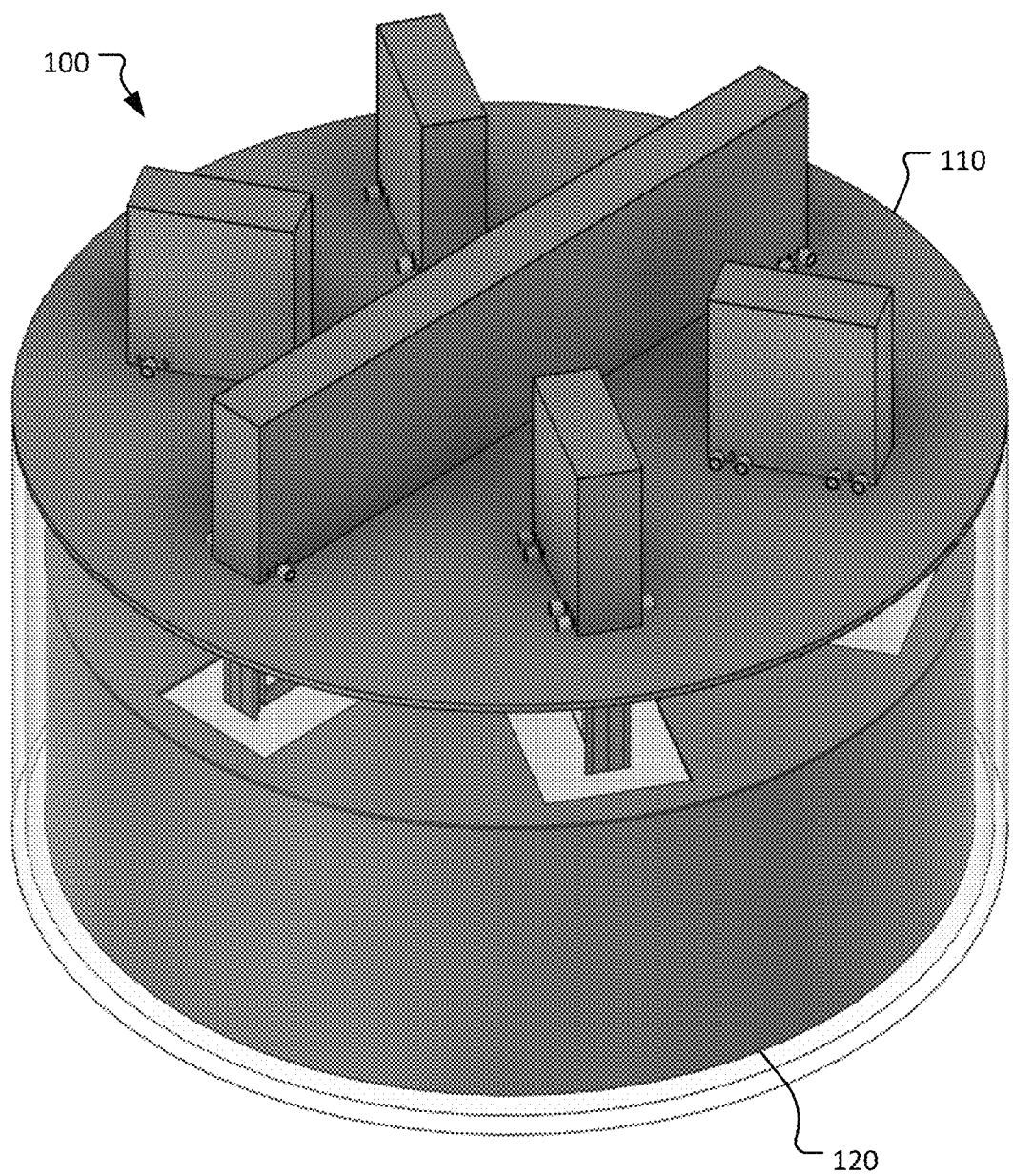
FIG. 2 shows the HESS of FIG. 1 with a portion of the vacuum chamber being transparent.
Figure 3:
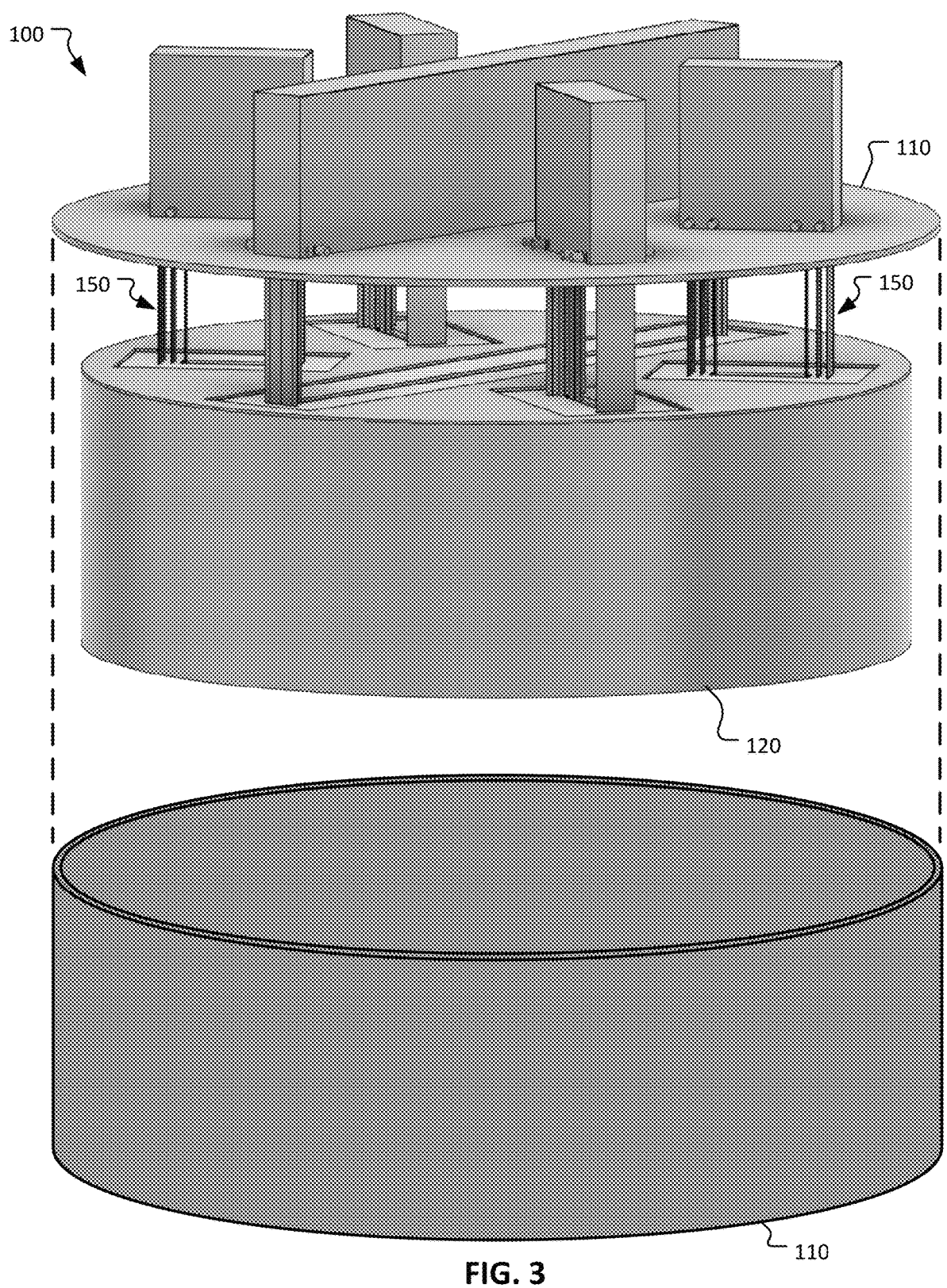
FIG. 3 shows the HESS of FIG. 1 with a portion of the vacuum chamber being removed.

FIG. 2 shows a view of the HESS 100 with a lower portion of the vacuum chamber 110 being transparent. FIG. 3 shows an exploded view of the HESS 100. In particular, the vacuum chamber 110 is shown in an exploded manner so that its inner contents are visible.

Figure 5:
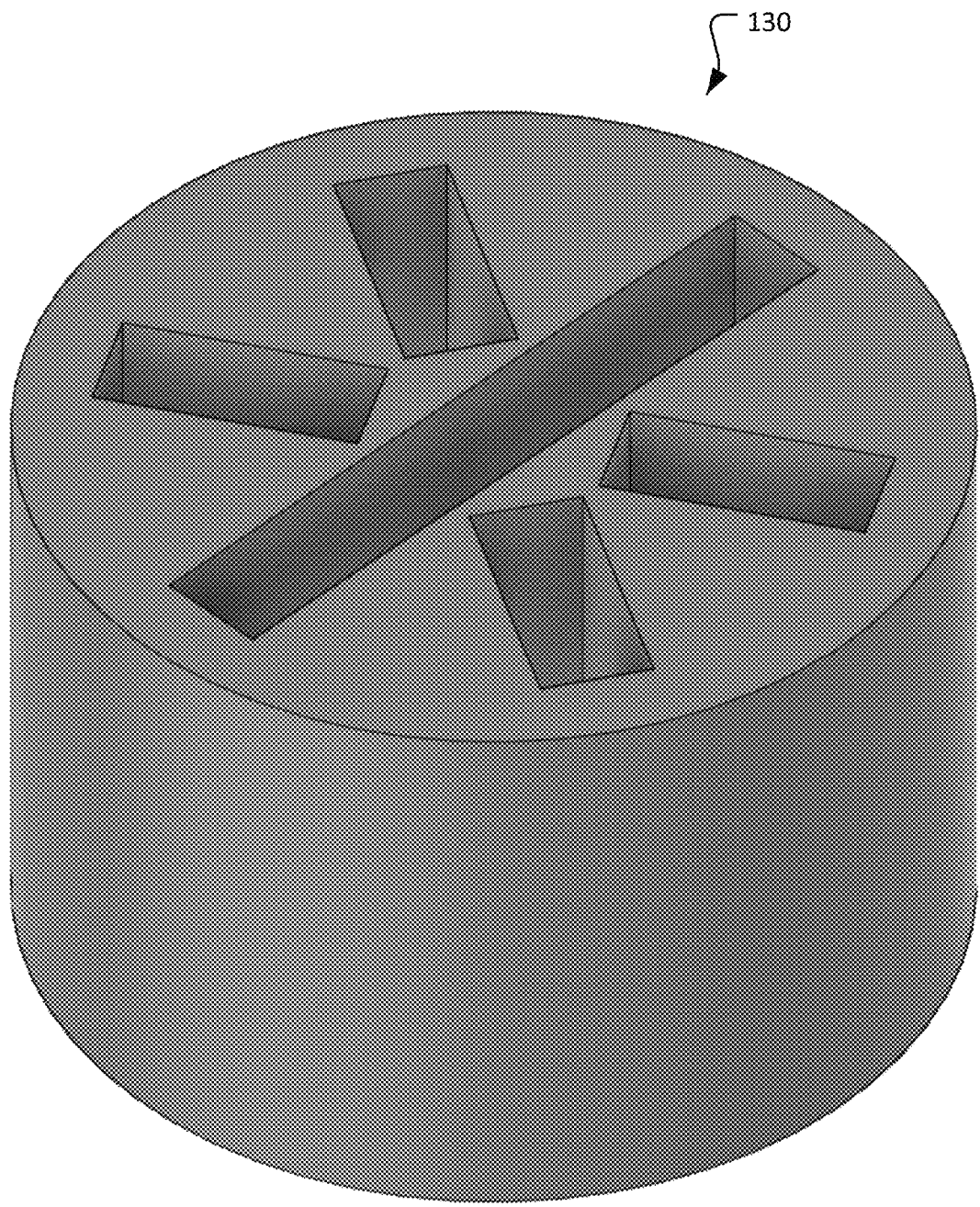
FIG. 5 shows a thermal energy storage tank of the HESS of FIG. 1.
Figure 6:
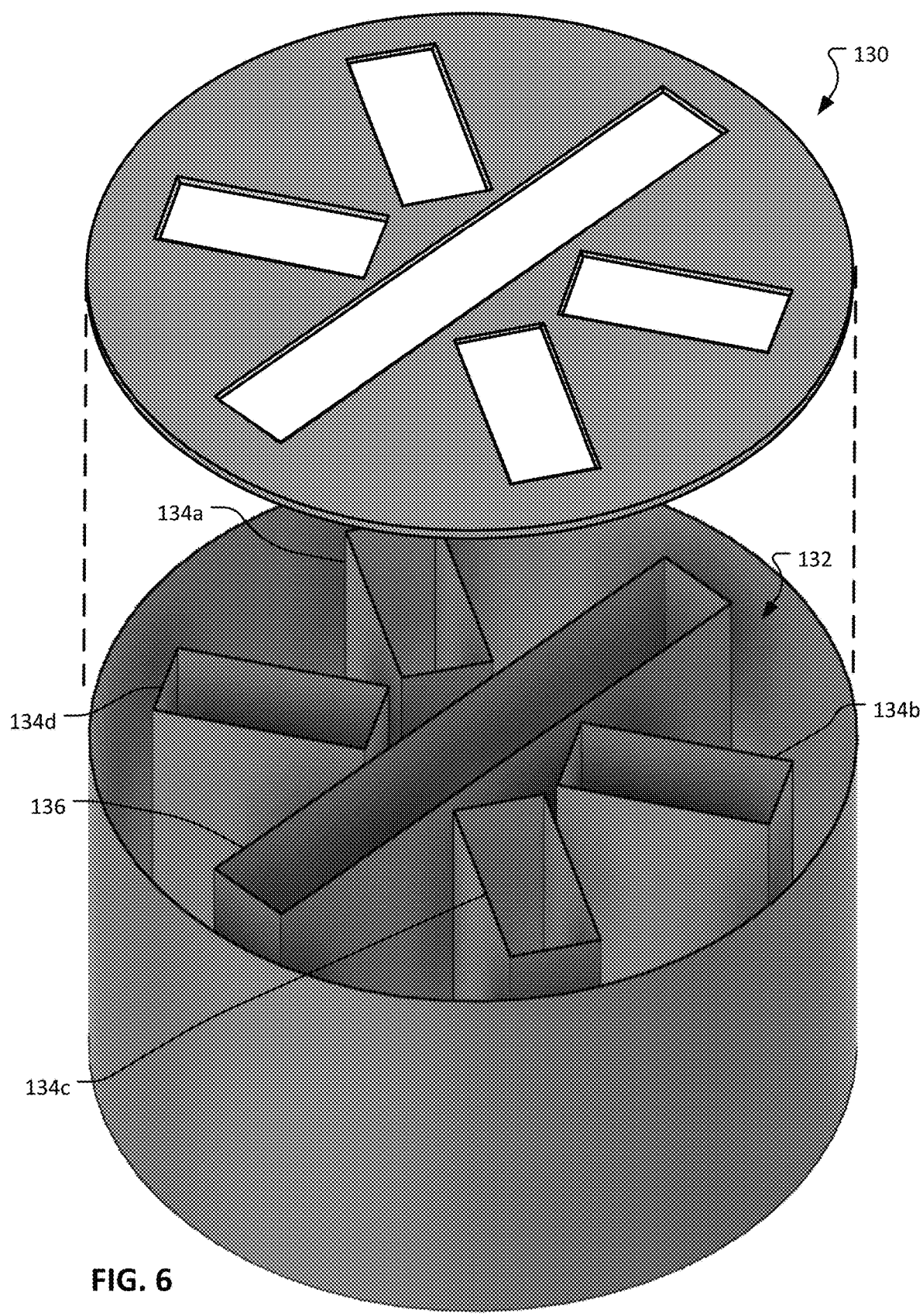
FIG. 6 shows an exploded view of the thermal energy storage tank of FIG. 5.
Figure 7:
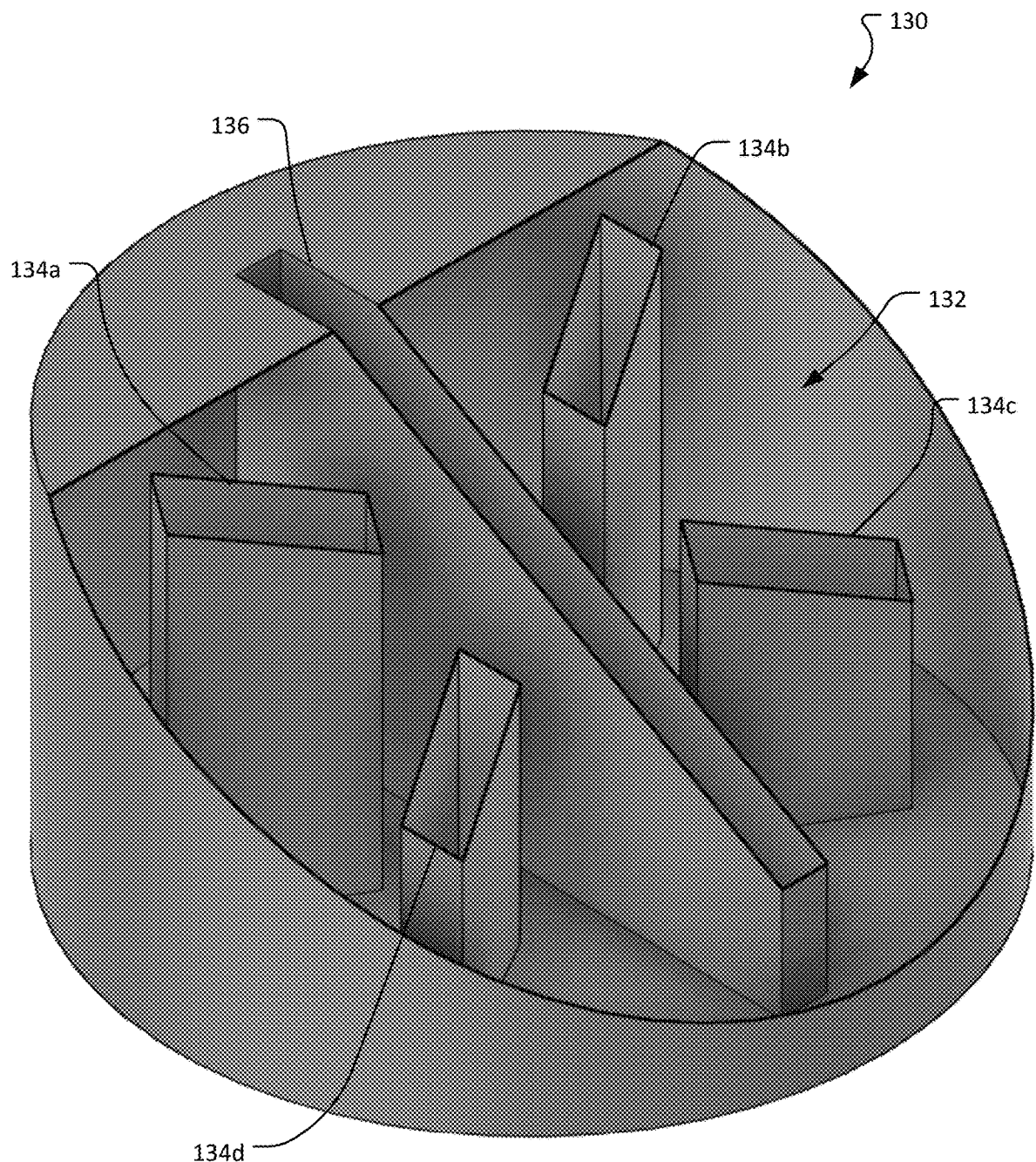
FIG. 7 shows a diagonal cross-sectional view of the thermal energy storage tank of FIG. 5.

Both of these views reveal an assembly comprising a radiant barrier 120 that surrounds a thermal storage tank 130 (not visible; refer to FIG. 5 et al.) located within the vacuum chamber 110. The vacuum of the vacuum chamber 110 permeates all spaces within the vacuum chamber 110. Accordingly, all of the internal spaces within the radiant barrier 120 and thermal storage tank 130 are vacuum spaces that virtually eliminate the occurrence of convective and conductive heat transfer.

FIG. 3 also reveals portions of multiple actuator systems 150 (which include the actuator motors 152 shown in FIG. 1). The structures and functions of the actuator systems 150 will be described further below.

Figure 4:
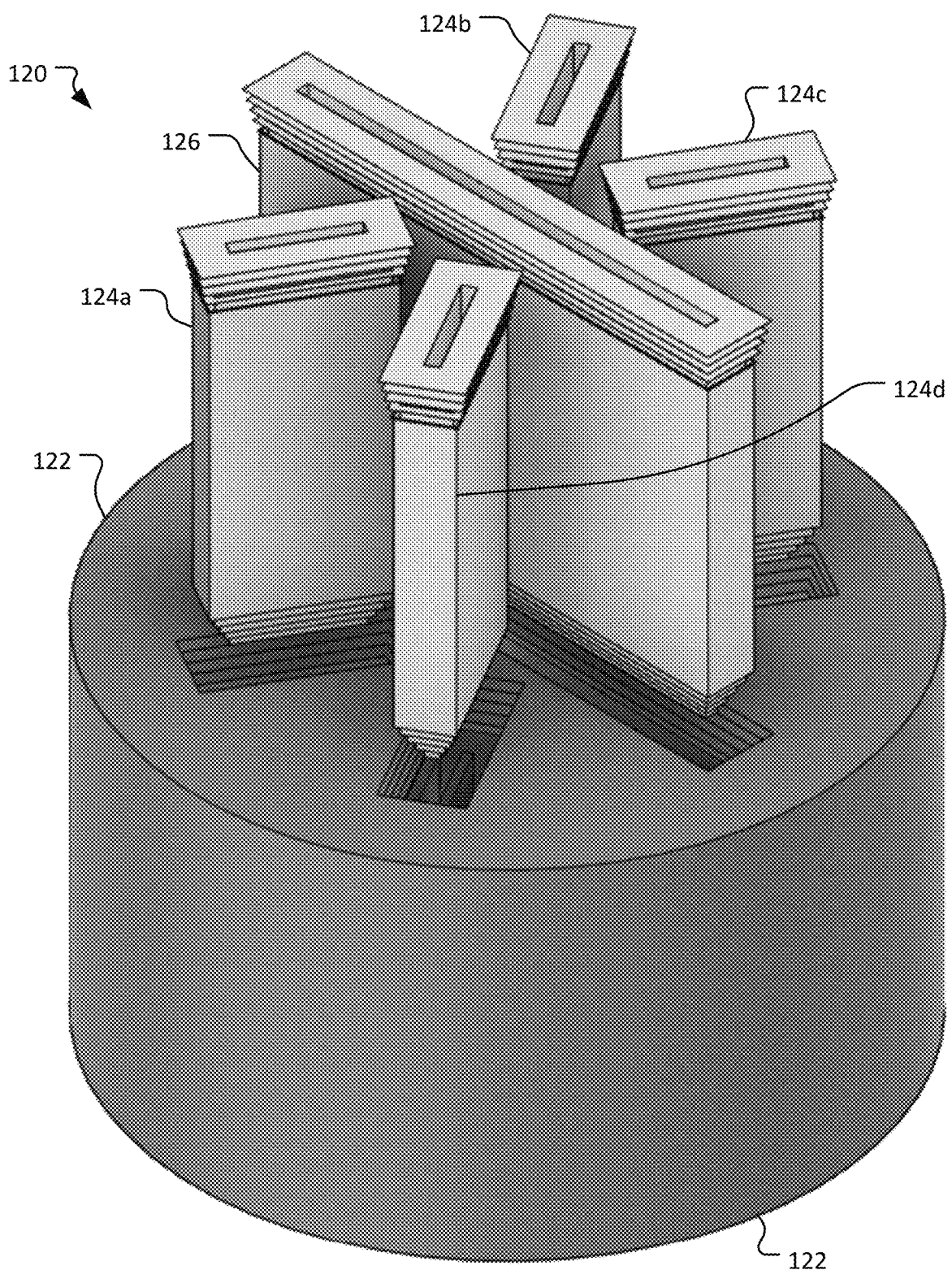
FIG. 4 shows an example radiant barrier of the HESS of FIG. 1.

FIG. 4 shows the radiant barrier 120 in more detail. Here it can be seen that the radiant barrier 120 is made up of multiple portions. In particular, the radiant barrier 120 includes a stationary portion 122 and multiple movable portions 124a, 124b, 124c, 124d, and 126.

The multiple movable portions 124a-d and 126 are physically moved in and out of the stationary portion 122 at appropriately advantageous times by the multiple actuator systems 150. Here, the multiple movable portions 124a-d and 126 are shown in locations that are out of the stationary portion 122. The importance of the mobility of the multiple movable portions 124a-d and 126 will be described further below.

The radiant barrier 120 is made of multiple sheets of material that are spaced apart from each other (e.g., spaced by 2 mm or more). The sheets that make up the radiant barrier 120 are heat resistant metal sheets, metal alloy sheets, or non-metallic sheets that have smooth and shiny surfaces, and that have a low emissivity of thermal radiation (e.g., an emissivity of about 0.2 or less). However, in some embodiments the sheets that make up the radiant barrier 120 may have an emissivity that is higher than 0.2. In any case, the sheets that make up the radiant barrier 120 function to block, mitigate, or prevent radiative heat transfer.

The multiple sheets that make up the radiant barrier 120 can include a number of spaced-apart sheets (or layers) ranging from 4 to 10 sheets, or 8 to 14 sheets, or 12 to 18 sheets, or 16 to 22 sheets, or 20 to 26 sheets, or 24 to 30 sheets, or 28 to 34 sheets, or 32 to 38 sheets, or 36 to 44 sheets, or 10 to 20 sheets, or 20 to 30 sheets, or 30 to 40 sheets, or 40 to 50 sheets, without limitation. In some embodiments, the stationary portion 122 and multiple movable portions 124a-d and 126 have the same numbers of the spaced-apart sheets. In some embodiments, the stationary portion 122 and multiple movable portions 124a-d and 126 have differing numbers of the spaced-apart sheets.

In some embodiments, the multiple sheets that make up the radiant barrier 120 can be all made of the same material. Alternatively, the multiple sheets that make up the radiant barrier 120 can be all made of differing materials (e.g., for the different layers). The innermost layers of the sheets will receive the most intense thermal radiation directly or indirectly from the thermal storage tank 130. In an example when the thermal energy storage medium within the thermal storage tank 130 is molten silicon, the highest temperature of thermal storage tank 130 will be about 1,500° C. Therefore, Molybdenum can be a preferred choice of the material for the innermost sheets that make up the radiant barrier 120. However, the temperature of an outermost sheet that makes up the radiant barrier 120 that includes 20 or more layers of sheets will be a few hundred degrees Celsius. Accordingly, stainless steel can be a preferred choice of material for the outermost sheets that make up the radiant barrier 120. In an example when the thermal energy storage medium within the thermal storage tank 130 is molten salt, the highest temperature of thermal storage tank 130 will be about 580° C. Therefore, stainless steel is good alternative for the material of all of the sheets that make up the radiant barrier 120 for a thermal storage tank 130 that contains molten salt. However, the materials of sheets that make up the radiant barrier 120 are not limited to Molybdenum or stainless steels.

Figure 8:
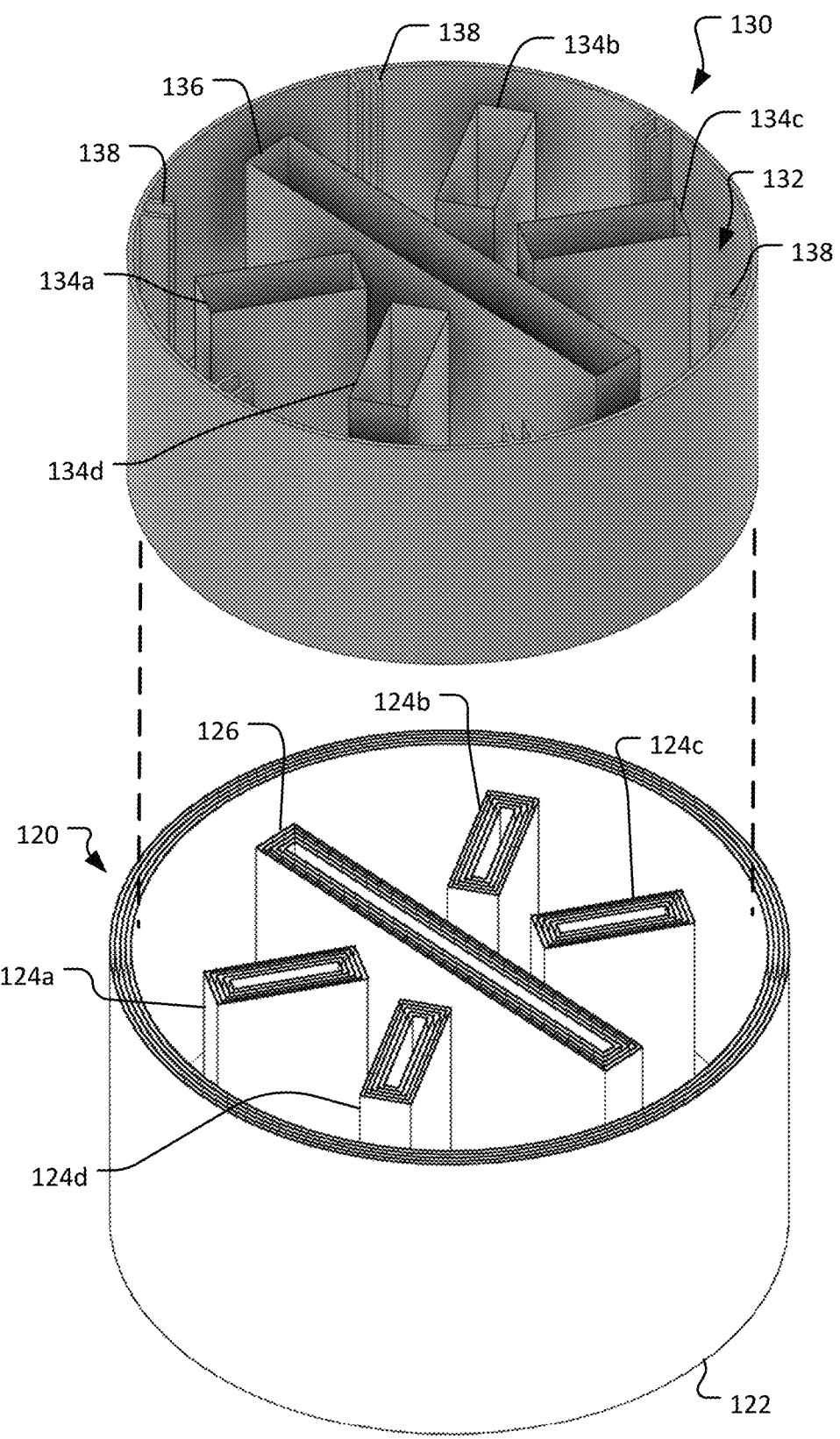
FIG. 8 shows portions of the thermal energy storage tank of FIG. 5 and the radiant barrier of FIG. 4 in an exploded perspective view.

Referring also to FIGS. 5-8, the thermal energy storage tank 130 is located within the radiant barrier 120 (see especially the exploded view of FIG. 8 which, for greater visibility, does not show the tops of the thermal energy storage tank 130 or the radiant barrier 120). The innermost layer of the radiant barrier 120 is spaced apart from the outer wall surface of the thermal energy storage tank 130.

Figure 9:
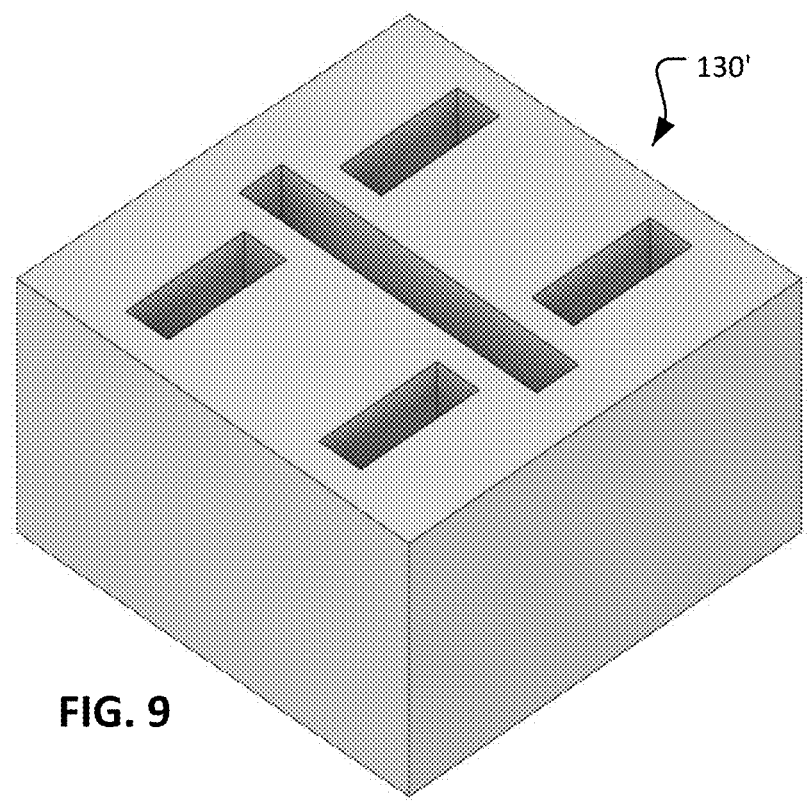
FIG. 9 shows another example thermal energy storage tank.
Figure 10:
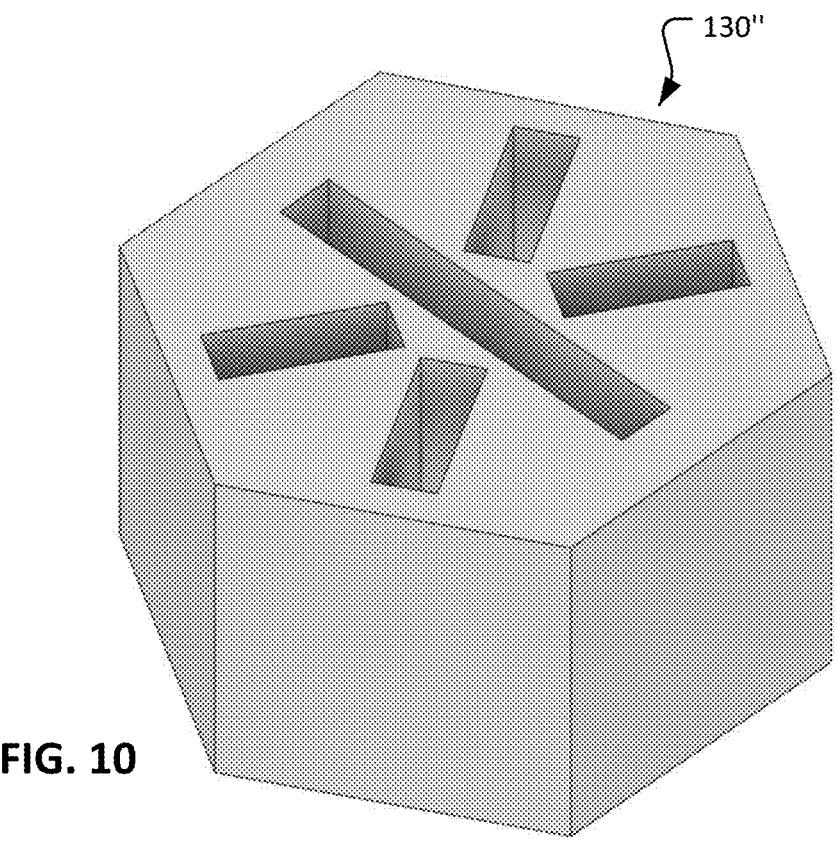
FIG. 10 shows another example thermal energy storage tank.

In this example, the thermal energy storage tank 130 (and the radiant barrier 120) is cylindrical. However, FIGS. 9 and 10 illustrate two other possible shapes. In particular, FIG. 9 illustrates a thermal energy storage tank 130' that has a rectangular transverse cross-sectional shape, and FIG. 10 illustrates a thermal energy storage tank 130" that has a hexagonal transverse cross-sectional shape. Various other possible shapes of the thermal energy storage tank are also possible.

The thermal energy storage tank 130 can be constructed of materials such as, but not limited to, Molybdenum, stainless steel, metal alloys, ceramic-coated materials, and other metals or ceramic compositions.

Still referring to FIGS. 5-8, the thermal energy storage tank 130 includes one or more walls that define: (i) an enclosed interior space 132 and (ii) a plurality of open spaces 134a, 134b, 134c, 134d, and 136 that extend within the enclosed interior space 132. In the depicted embodiment, the plurality of open spaces 134a-d and 136 extend all the way through from the top to the bottom of the thermal energy storage tank 130. Accordingly, it can be said that the walls of the thermal energy storage tank 130 that define the plurality of open spaces 134a-d and 136 are like tubes or pass-through holes. In this example, the tubes have rectangular cross-sectional shapes. However, any other type of cross-sectional shape can be utilized, such as circular, triangular, polygonal, etc. Moreover, multiple different types of shapes can be combined in a single embodiment of the thermal energy storage tank 130 (and the radiant barrier 120).

The enclosed interior space 132 contains the thermal energy storage medium 140 (not shown). The thermal energy storage medium 140 can be a material such as silicon, salt, or other materials. When heated, the silicon or salt, for example, will become molten within the enclosed interior space 132 so as to store a high level of thermal energy.

In the depicted embodiment, the thermal energy storage tank 130 defines a total of five of the open spaces 134a-d and 136. It should be understood that this is just one example, and that any number of the open spaces can be included in various configurations of the thermal energy storage tank 130.

The plurality of open spaces 134a-d and 136 defined by the thermal energy storage tank 130 are shaped and sized to receive therein the multiple movable portions 124a-d and 126 of the radiant barrier 120. That is, the multiple movable portions 124a-d and 126 of the radiant barrier 120 can extend within (and can be retracted out of) the plurality of open spaces 134a-d and 136 defined by the thermal energy storage tank 130. The stationary portion 122 of the radiant barrier 120 surrounds the other exterior walls of the thermal energy storage tank 130 (i.e., other than the walls that define the plurality of open spaces 134a-d and 136). Accordingly, all exterior wall surfaces of the thermal energy storage tank 130 are covered by the radiant barrier 120. This arrangement advantageously minimizes the radiative heat losses from the thermal energy storage tank 130. However, there are instances when heat transfer to or from the energy storage tank 130 is desirable (e.g., such as when transferring heat energy to the thermal energy storage medium 140, or when extracting heat energy from the thermal energy storage medium 140). In such cases, and as described further below, some or all of the multiple movable portions 124a-d and/or 126 of the radiant barrier 120 can be moved out of the plurality of open spaces 134a-d and 136 defined by the thermal energy storage tank 130.

Figure 11:
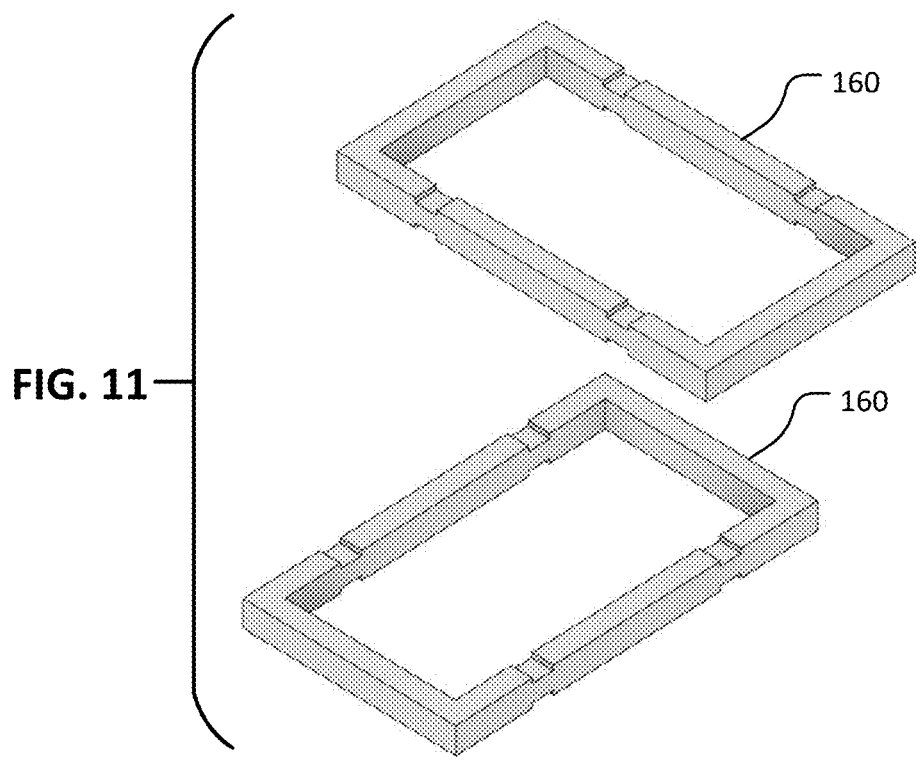
FIG. 11 shows two example spacer members that can be used with the HESS of FIG. 1.
Figure 12:
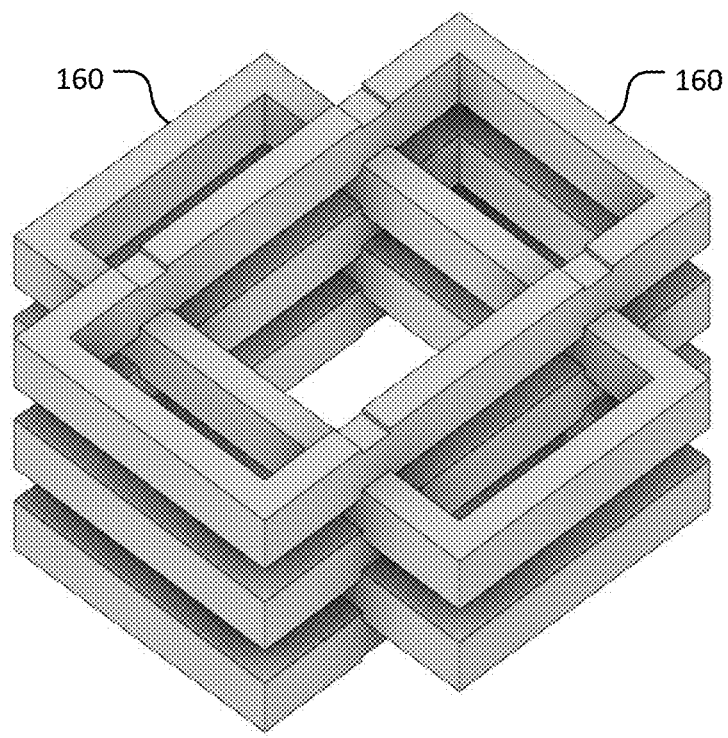
FIG. 12 shows five of the spacer members of FIG. 11 that are interlocked together in a stacked arrangement.

Referring to FIGS. 11 and 12, as stated above the innermost layer of the radiant barrier 120 is spaced apart from the outer wall surface of the thermal energy storage tank 130. In addition, each layer of the radiant barrier 120 is spaced apart from its adjacent layers. In order to achieve this physical spacing (which is conducive to achieving a high level of thermal insulation), while providing structural support to the layers of the radiant barrier 120 and to the thermal energy storage tank 130, spacers 160 can be incorporated in the HESS 100.

Figure 13:
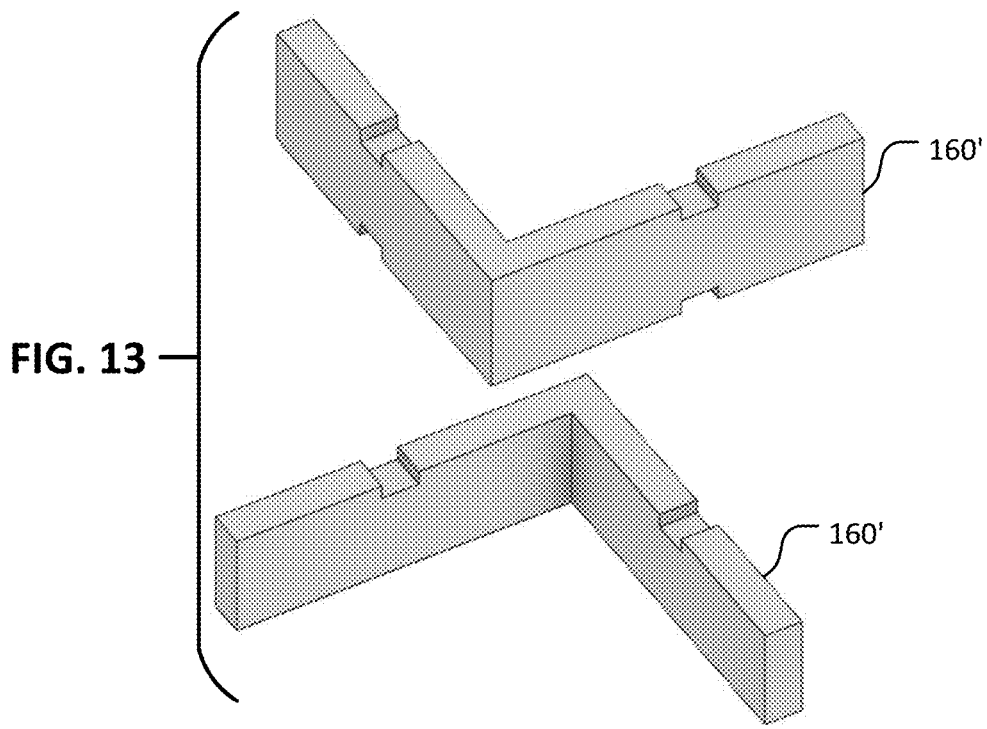
FIG. 13 shows two more example spacer members that can be used with the HESS of FIG. 1.
Figure 14:
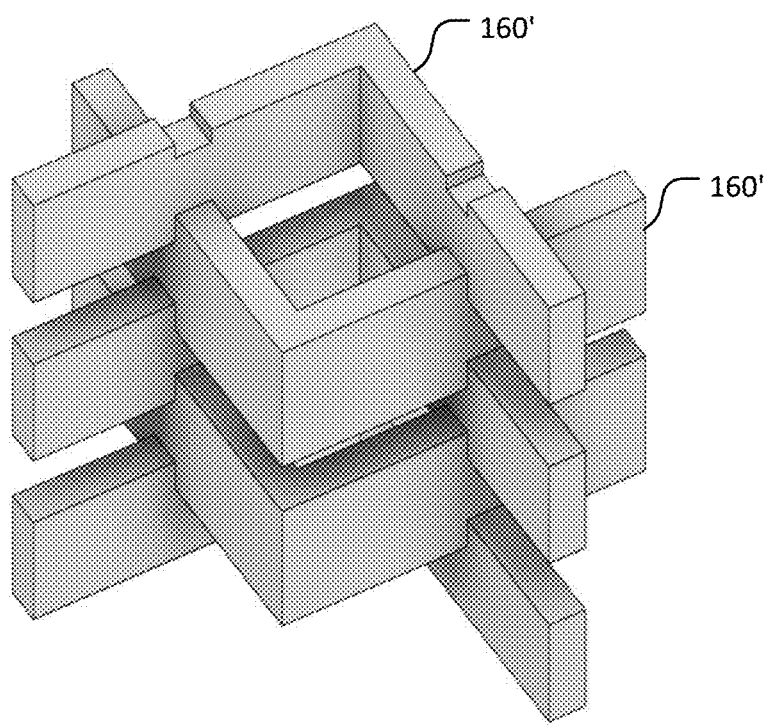
FIG. 14 shows five of the spacer members of FIG. 13 that are interlocked together in a stacked arrangement.

The example spacers 160 are rectangular members that nest and interlock together to create a mechanically sturdy stack (such as illustrated in FIG. 12). FIGS. 13 and 14 illustrate L-shaped spacers 160' that are alternatives to the rectangular spacers 160.

While the use of the spacers 160 will result in some loss of thermal energy by conduction from the thermal energy storage tank 130 to the radiant barrier 120, and from the radiant barrier 120 to the vacuum chamber 110, the spacers 160 are specially designed to minimize such losses. For example, the spacers 160 comprise several pieces of mutually interlocking small solid blocks that are stacked up vertically. The resistance to heat conduction across the minimized interfacing surfaces of the stacked spacers 160 is very high. The interfacing surfaces are ideally a dry interface with no wetting and no fusion of between adjacent spacers 160. The resistance of heat conduction across such an interface of two solid blocks is much higher than the resistance of heat conduction through the solid blocks themselves. Accordingly, it is advantageous to use multiple spacers 160 that are stacked on each other. Moreover, the solid material of the spacers 160 itself should be selected to have a low thermal conductivity and also should have enough hardness.

A vertical stack of multiple thin solid spacers 160 made of materials such as Zirconia will have very high resistance of heat conduction across one end of the stack to the other end of the stack. Zirconia, an oxide of zirconium, has a maximum service temperature of 2249° C. Its compressive strength is 5200 Mpa, and its low thermal conductivity is 2.7 W/m-K. However, the material of the solid spacers 160 for this purpose is not limited to Zirconia.

A major contributor to the very high resistance of heat conduction of the stack of spacers 160 comes from the high resistance of heat conduction across each of the interfacing contact surfaces of adjacent spacers 160 in the stack. This is why it is desirable that many solid spacers 160 should be stacked vertically (e.g., five or more). In addition, this is why the surface area of the interfacing contact surfaces should be minimized. A vertical stack of many such solid spacers 160 should be used as one of many support columns that supports and holds the weight of the thermal energy storage tank 130 and the multiple sheets of the radiant barrier 120 (e.g., the stationary portion 122 of the radiant barrier 120).

Figure 15:
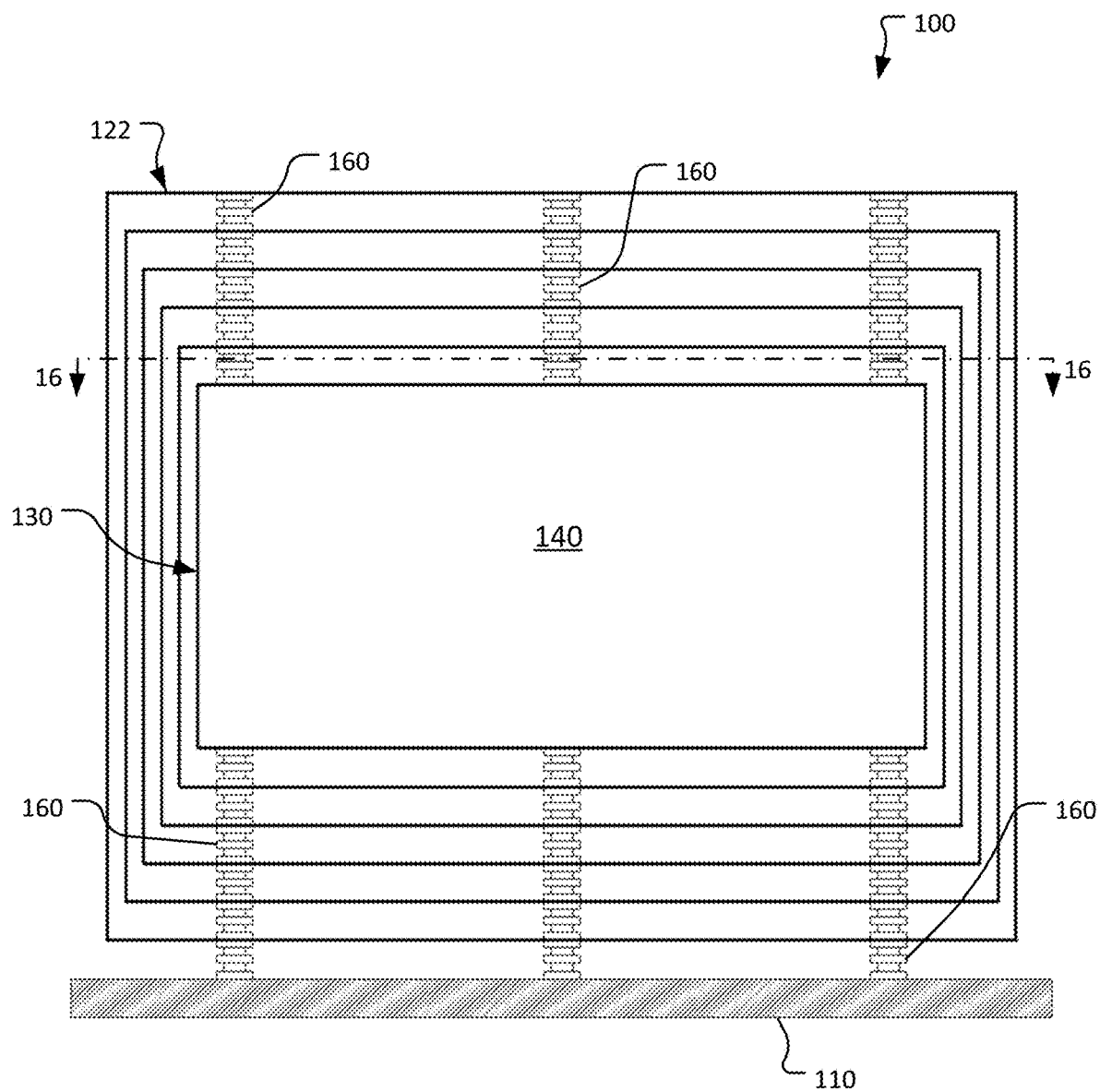
FIG. 15 is a schematic diagram illustrating the use of spacer members in the HESS of FIG. 1.

FIG. 15 schematically depicts the HESS 100 with its thermal energy storage tank 130 containing the thermal energy storage medium 140, which is surrounded by the radiant barrier 120 (in particular, the stationary portion 122 of the radiant barrier 120), which is in turn located inside of the vacuum chamber 110. Also depicted, are multiple stacks of spacers 160. As shown, the spacers 160 are utilized to provide vertical support and physical rigidity to the structure of the HESS 100.

In the depicted schematic example, stacks of spacers 160 are positioned between the inner wall surface of the vacuum chamber 110 and the outermost layer of the radiant barrier 120. Additional stacks of the spacers 160 are positioned between the adjacent layers of the radiant barrier 120. Moreover, stacks of the spacers 160 are also positioned between the innermost layer of the radiant barrier 120 and the outer wall surface of the thermal energy storage tank 130.

Figure 16:
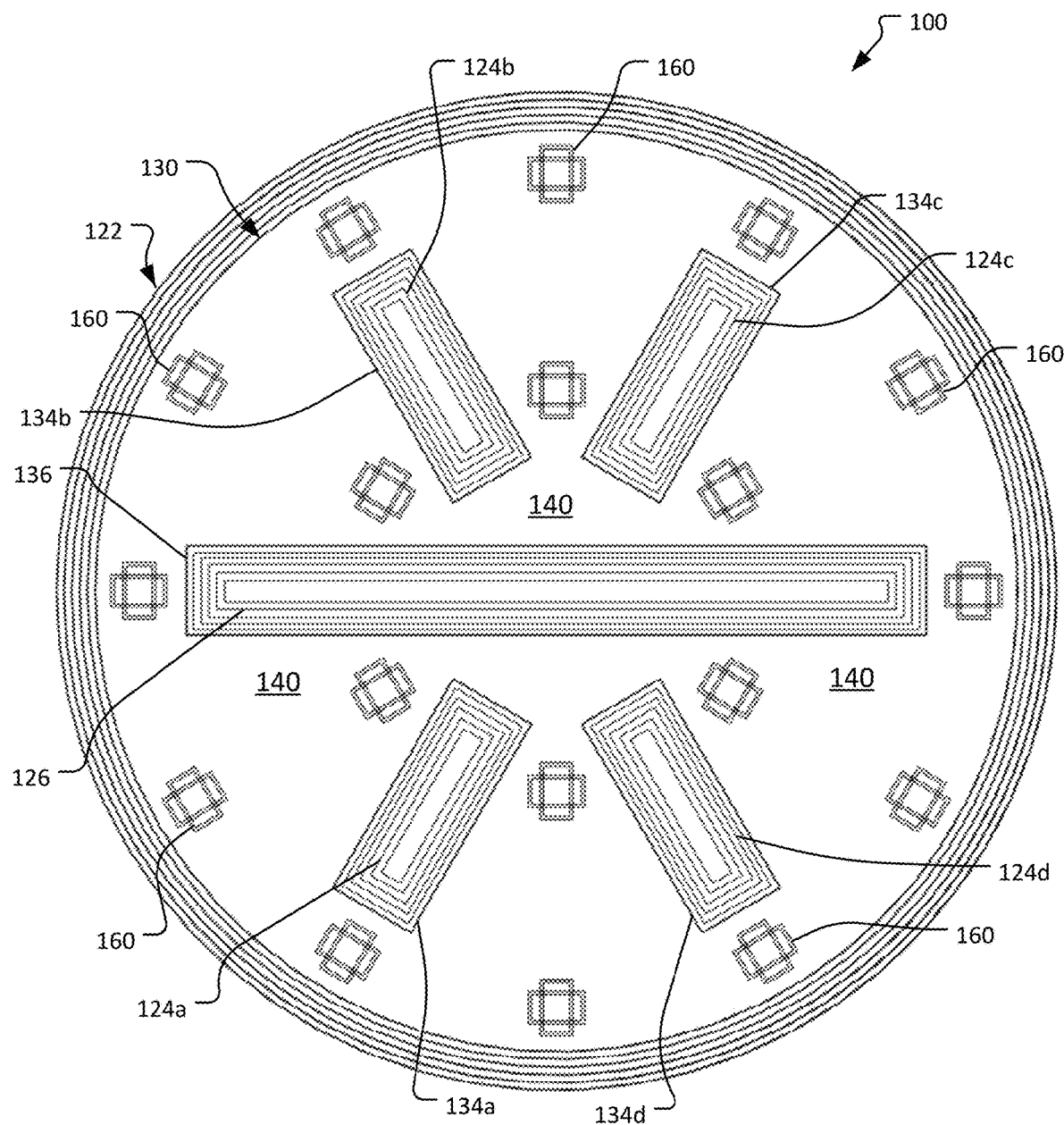
FIG. 16 is another schematic diagram illustrating the use of spacer members in the HESS of FIG. 1, and taken along the cut-plane 16-16 as indicated in FIG. 15.

FIG. 16 provides another schematic illustration of the use of the stacks of spacers 160 in the HESS 100. Here, a top view of the HESS 100 shows the thermal energy storage tank 130 containing the thermal energy storage medium 140, which is surrounded by the radiant barrier 120 (in particular, the stationary portion 122 of the radiant barrier 120).

In the depicted schematic example, stacks of spacers 160 are arranged in two radial groupings (an inner radial grouping and an outer radial grouping). Such an arrangement of multiple stacks of spacers 160 can be utilized to provide vertical support and physical rigidity to the structure of the HESS 100. Also, note that as shown in FIG. 8, in some embodiments the inner wall of the thermal energy storage tank 130 can include vertical beams 138 to provide extra rigidity to the walls of the thermal energy storage tank 130.

Also shown in FIG. 16 are the multiple movable portions 124*a*-*d* and 126 of the radiant barrier 120 that are depicted within the plurality of open spaces 134*a*-*d* and 136 defined by the thermal energy storage tank 130. The movement of the multiple movable portions 124*a*-*d* and 126 of the radiant barrier 120 will be described next in reference to FIGS. 17-25.

Figure 17:
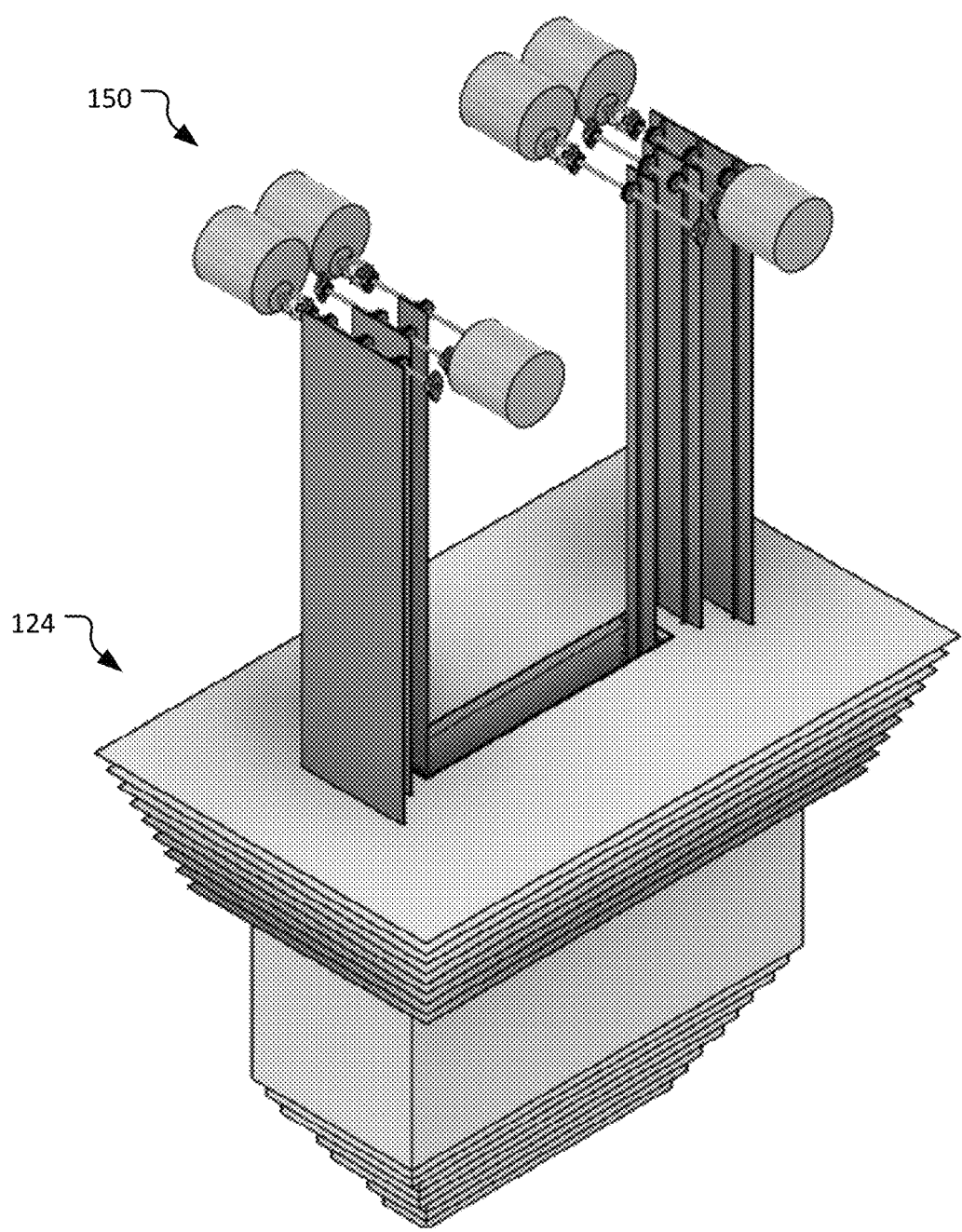
FIG. 17 shows a movable radiant barrier and actuator system of the HESS of FIG. 1 in a first configuration.

FIG. 17 illustrates an example actuator system 150 that is coupled to an example movable portion 124 of the radiant barrier 120. In the depicted arrangement, the movable portion 124 of the radiant barrier 120 is configured in its fully deployed arrangement. That is, in the depicted arrangement the movable portion 124 is configured to be fully located within its respective open space of the thermal energy storage tank 130 (not shown here for enhanced visibility of the movable portion 124). This fully deployed configuration is also schematically depicted in FIG. 22 that shows a cross-sectional view of the assembly including the thermal energy storage tank 130 containing the thermal energy storage medium 140, the stationary portion 122 of the radiant barrier 120, the movable portion 124 of the radiant barrier 120, and a representative thermal member 170. The thermal member 170 is representative of a heating device or a heating reservoir as described further below in reference to FIGS. 26 and 27.

Figure 22:
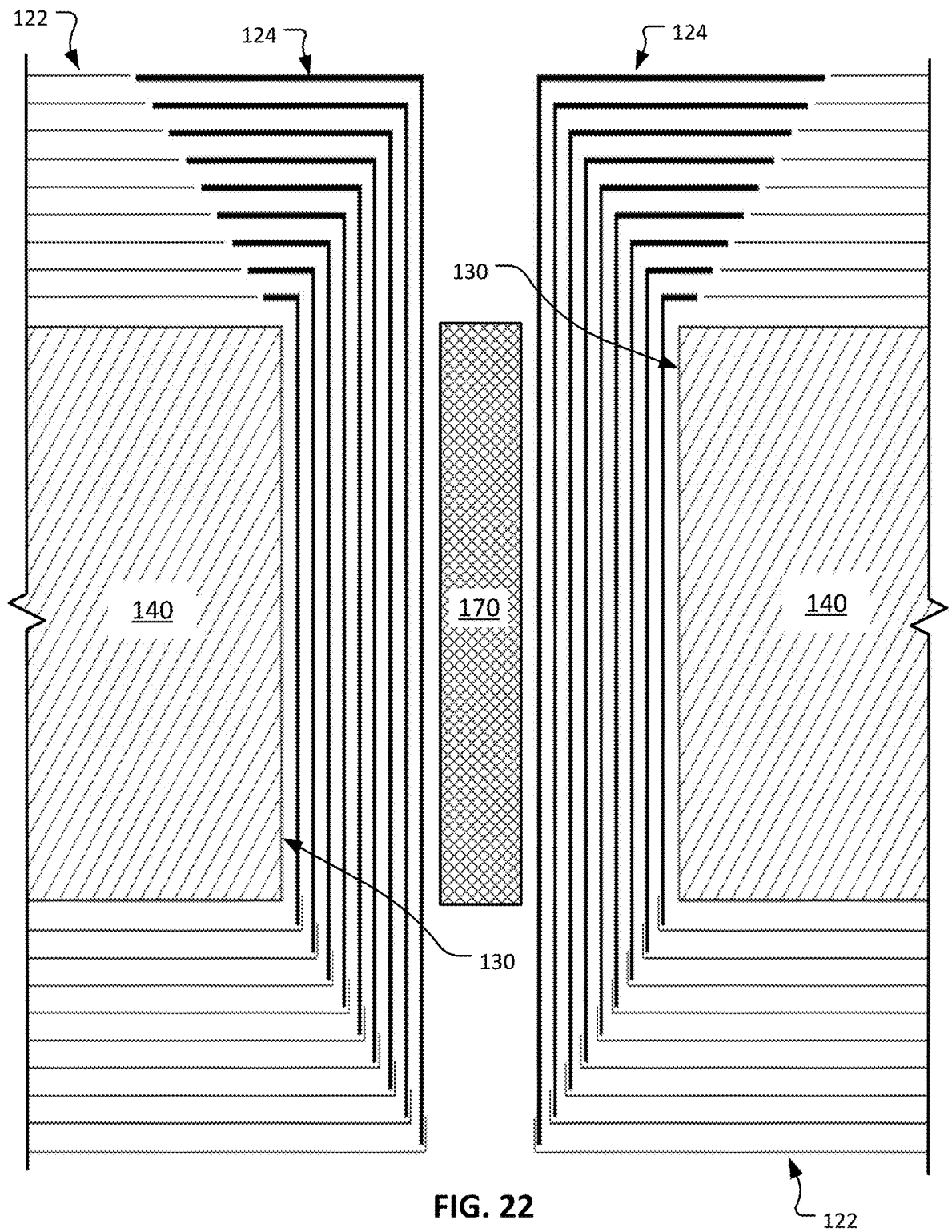
FIG. 22 schematically depicts the arrangement of FIG. 17.
Figure 23:
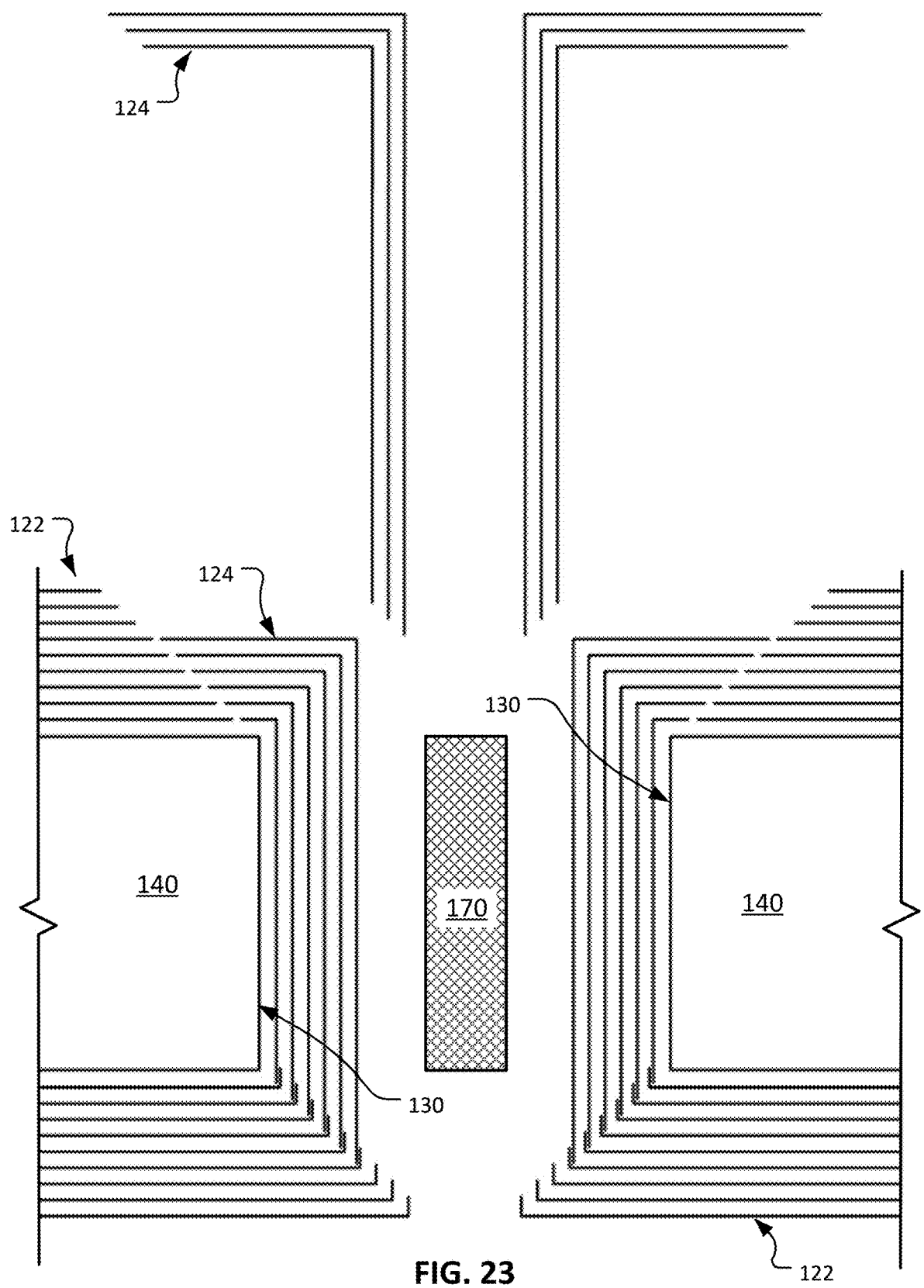
FIG. 23 schematically depicts the arrangement of FIG. 18.
Figure 24:
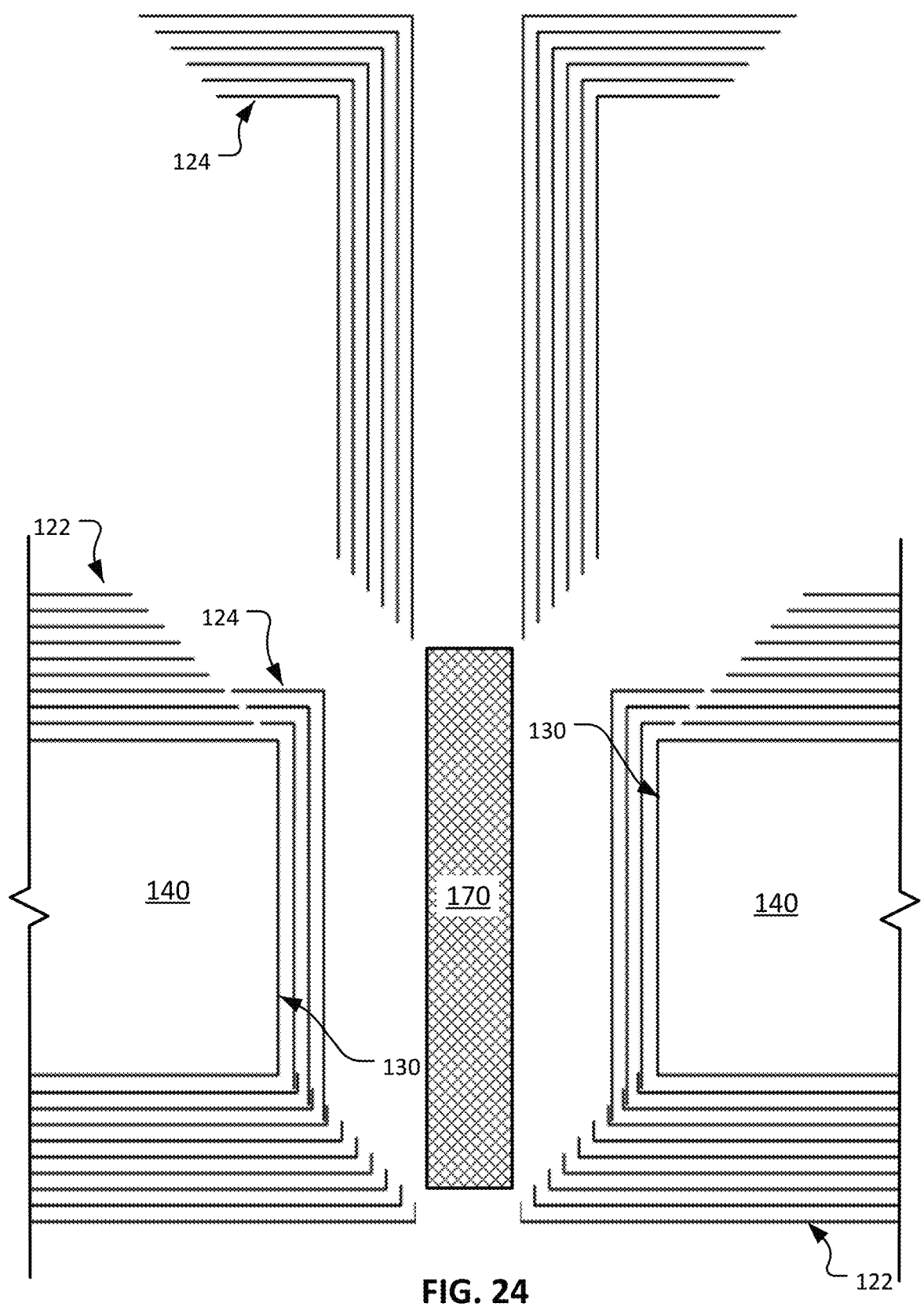
FIG. 24 schematically depicts the arrangement of FIG. 19.
Figure 25:
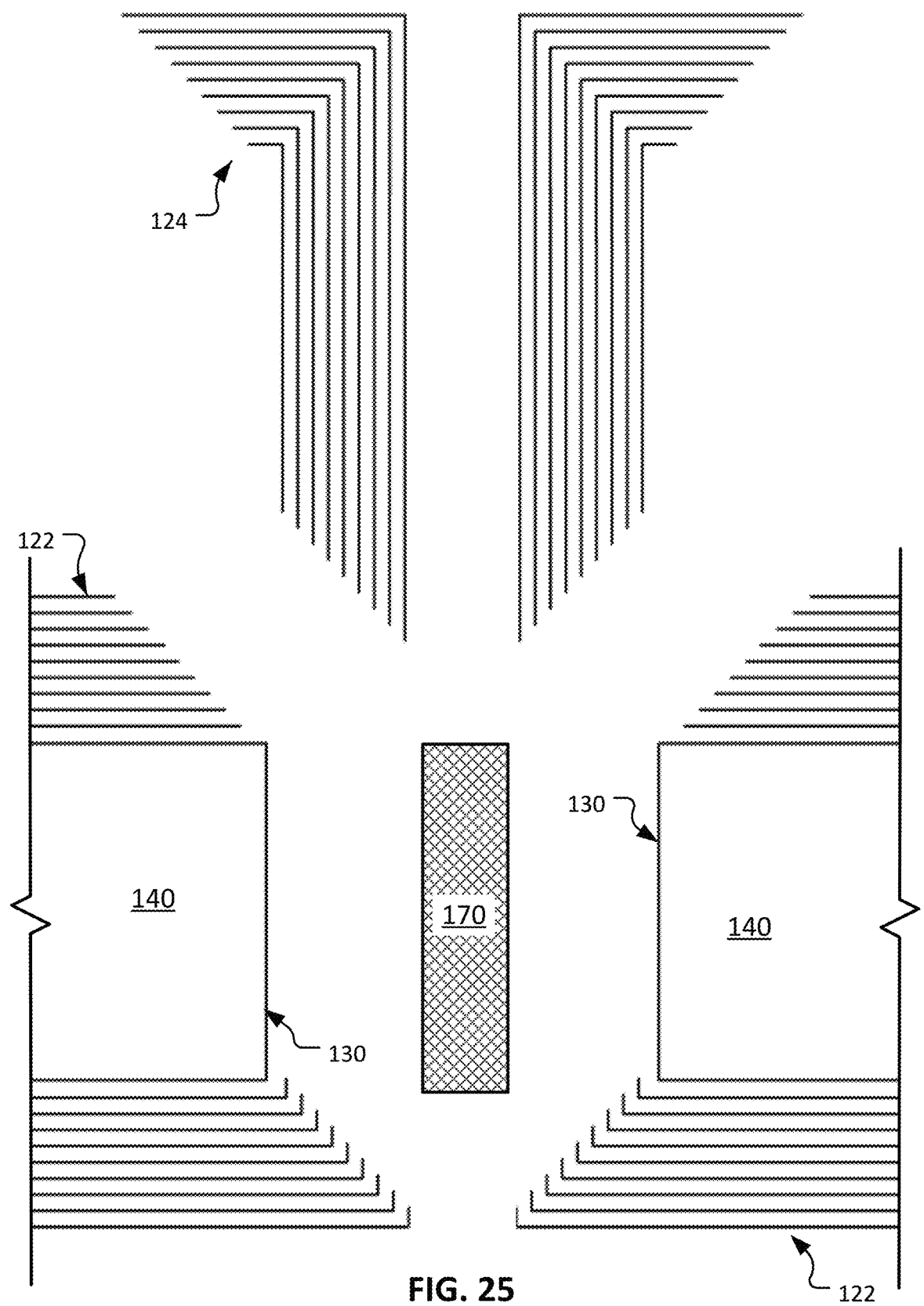
FIG. 25 schematically depicts the arrangement of FIG. 20.

As shown in FIG. 22, in the fully deployed configuration all of the sheets of the movable portion 124 of the radiant barrier 120 are positioned to block radiative heat transfer between the thermal energy storage tank 130 and the thermal member 170. In this illustrative example, there are nine separate sheets that make up the stationary portion 122 and the movable portion 124 of the radiant barrier 120. This is only an example. In some embodiments, more than nine or fewer than nine separate sheets can make up the stationary portion 122 and the movable portion 124 of the radiant barrier 120.

Also visible in FIG. 22 is an example manner in which the sheets of the stationary portion 122 and the movable portion 124 of the radiant barrier 120 can interface each other. In particular, in the depicted embodiment the lower edge portions of the sheets of the movable portion 124 overlap with vertically extending edge portions of the sheets of the stationary portion 122. Further, the upper edge portions of the sheets of the movable portion 124 extend horizontally into close alignment (almost touching) with the edge portions of the horizontally extending sheets of the stationary portion 122. These types of close or overlapping interfaces between the sheets of the stationary portion 122 and the movable portion 124 of the radiant barrier 120 are specifically designed to block radiative heat transfer through the interfaces.

Figure 18:
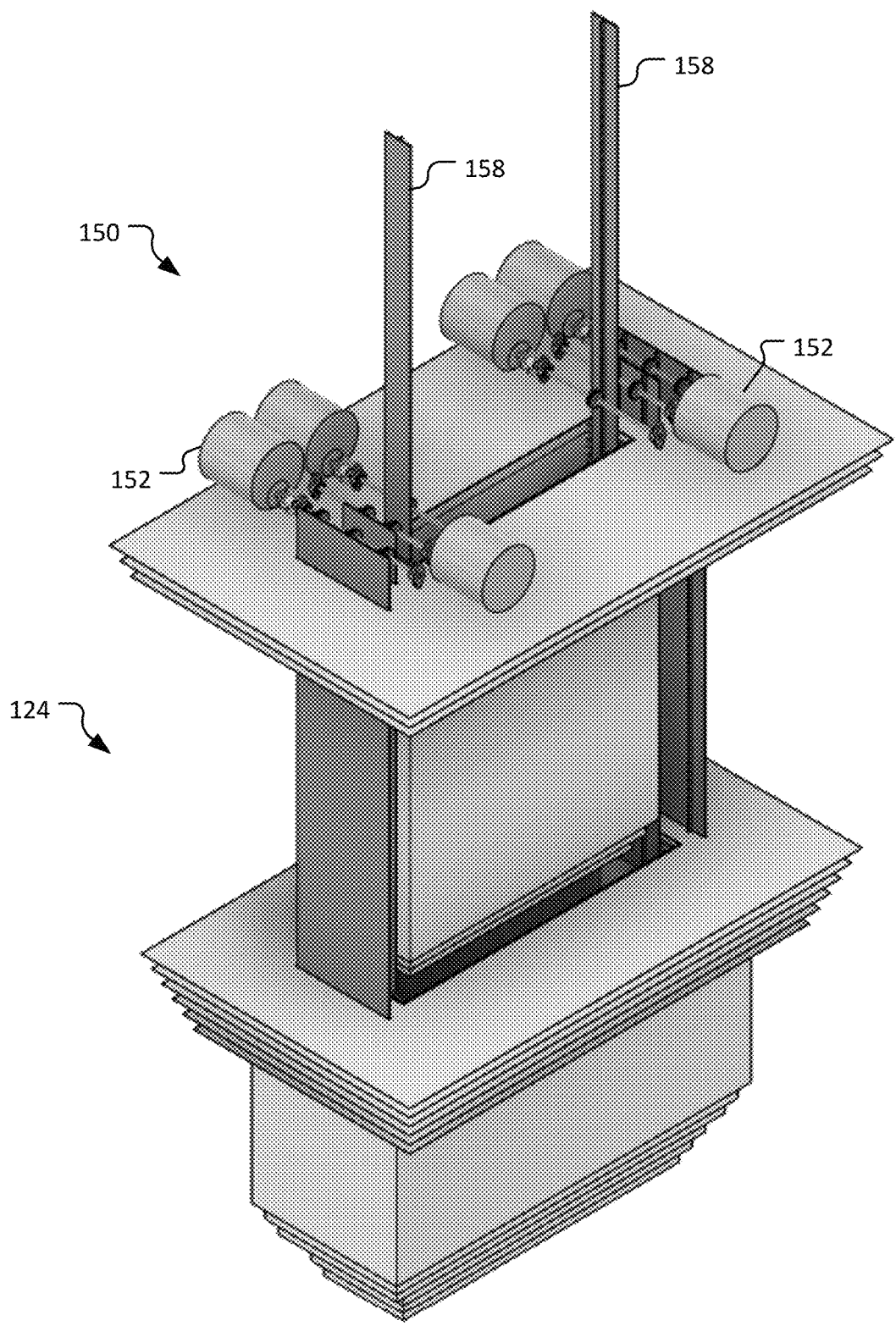
FIG. 18 shows the movable radiant barrier and actuator system of FIG. 17 in a second configuration.

Referring to FIG. 18, the configuration of the movable portion 124 of the radiant barrier 120 has now been adjusted (in comparison to FIG. 17) by raising some sheets of the movable portion 124 up from their prior positions in which they blocked radiation between the thermal energy storage tank 130 and the thermal member 170. This is also schematically depicted in FIG. 23. In this example, a grouping of three of the nine sheets of the movable portion 124 have been moved up from their prior positions in which they blocked radiation between the thermal energy storage tank 130 and the thermal member 170. It can be envisioned, accordingly, that the resistance to heat transfer between the thermal energy storage tank 130 and the thermal member 170 provided by the movable portion 124 of the radiant barrier 120 has now been adjusted to a lesser resistance.

The upward movement of the three sheets of the movable portion 124 can result from the operation of the actuator system 150. The example actuator system 150 will now be described in more detail.

Figure 21:
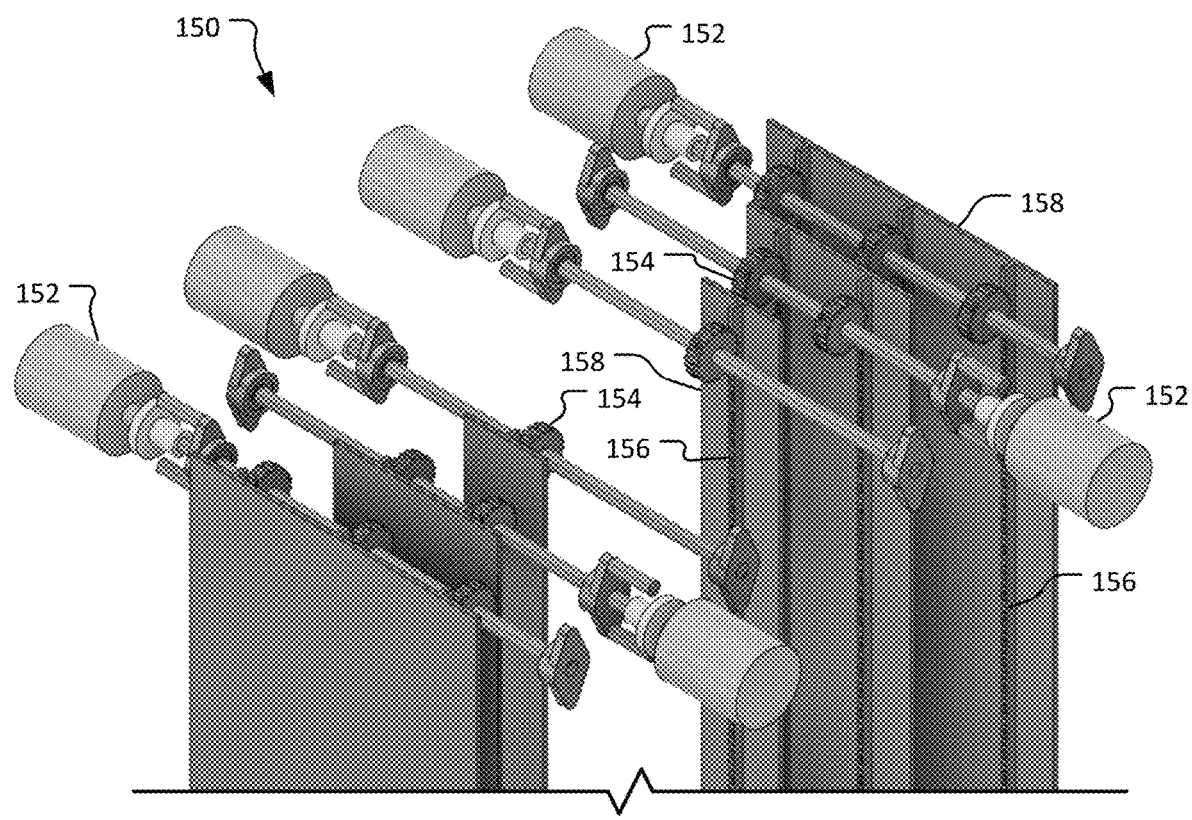
FIG. 21 shows the actuator system of FIG. 17.

Referring to FIG. 21, the example actuator system 150 is depicted in isolation so that its components are more readily observable. The actuator system 150 includes multiple actuator motors 152 (e.g., DC servo motors, stepper motors, etc.) that each drive one or more pinion gears 154 that are each meshed with a rack 156 that is attached to a vertical plate 158. The vertical plates 158, in turn, are each attached to one or more sheets of the movable portion 124 of the radiant barrier 120. In this non-limiting example, the vertical plates 158 are each attached to a grouping of three sheets of the movable portion 124 of the radiant barrier 120. Any number of the sheets can be grouped, or the sheets can be moved singularly by the actuator system 150. In any case, when the actuator motors 152 are activated, the respective vertical plates 158 will be driven upward or downward, and the associated sheets of the movable portion 124 will also be driven upward or downward.

In the depicted embodiment, matched pairs of the actuator motors 152 are activated contemporaneously so that two of the vertical plates 158 (one on each side of a grouping of the sheets of the movable portion 124) are moved synchronously. It should be understood that this type of actuator system 150 is just one example, and that other types of actuator systems can also be used (e.g., cable and capstan systems, linear actuator systems, etc.).

Still referring to FIG. 18, it can be seen that two of the vertical plates 158 have now been driven upward, and are extending well above the level of the actuator motors 152. Those vertical plates 158 are housed within the vacuum chamber 110, in the upper adjunct chamber portions 110' of the vacuum chamber 110 (as best seen in FIG. 1).

Figure 19:
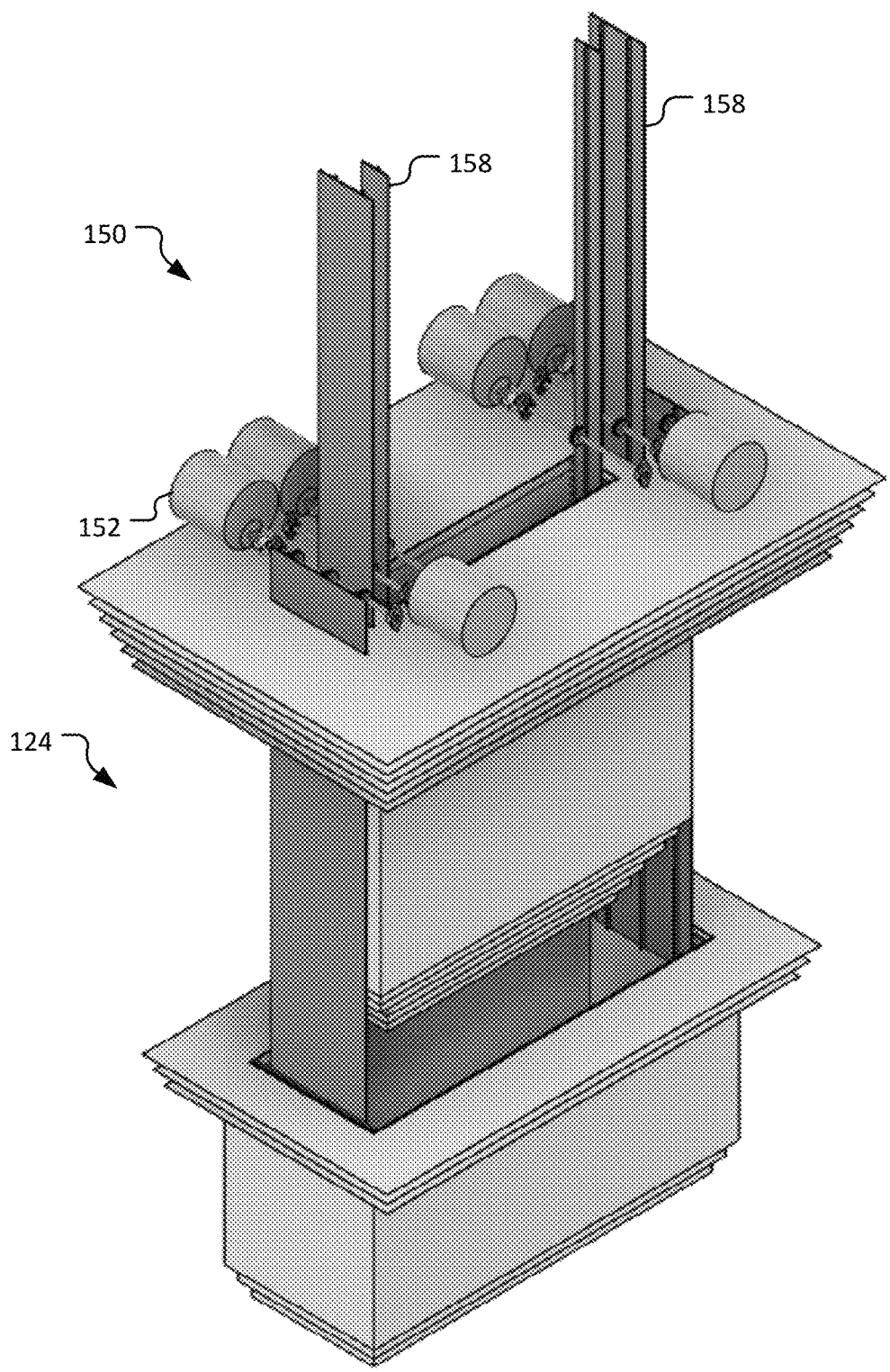
FIG. 19 shows the movable radiant barrier and actuator system of FIG. 17 in a third configuration.

Referring to FIG. 19, in the depicted configuration another pair of the actuator motors 152 have been activated so as to raise a second grouping of three sheets of the movable portion 124 of the radiant barrier 120. This configuration is also schematically depicted in FIG. 24. It can be seen that now, in this example, six layers of sheets of the movable portion 124 have been removed from blocking radiative heat transfer between the thermal energy storage tank 130 and the thermal member 170, and only three sheets of the movable portion 124 remain. Accordingly, the resistance to the radiative heat transfer between the thermal energy storage tank 130 and the thermal member 170 is now reduced further (as compared to the prior arrangement shown in FIGS. 18 and 23). This arrangement can be advantageously used, in some scenarios, to regulate an amount of heat transfer between the thermal energy storage tank 130 and the thermal member 170.

Figure 20:
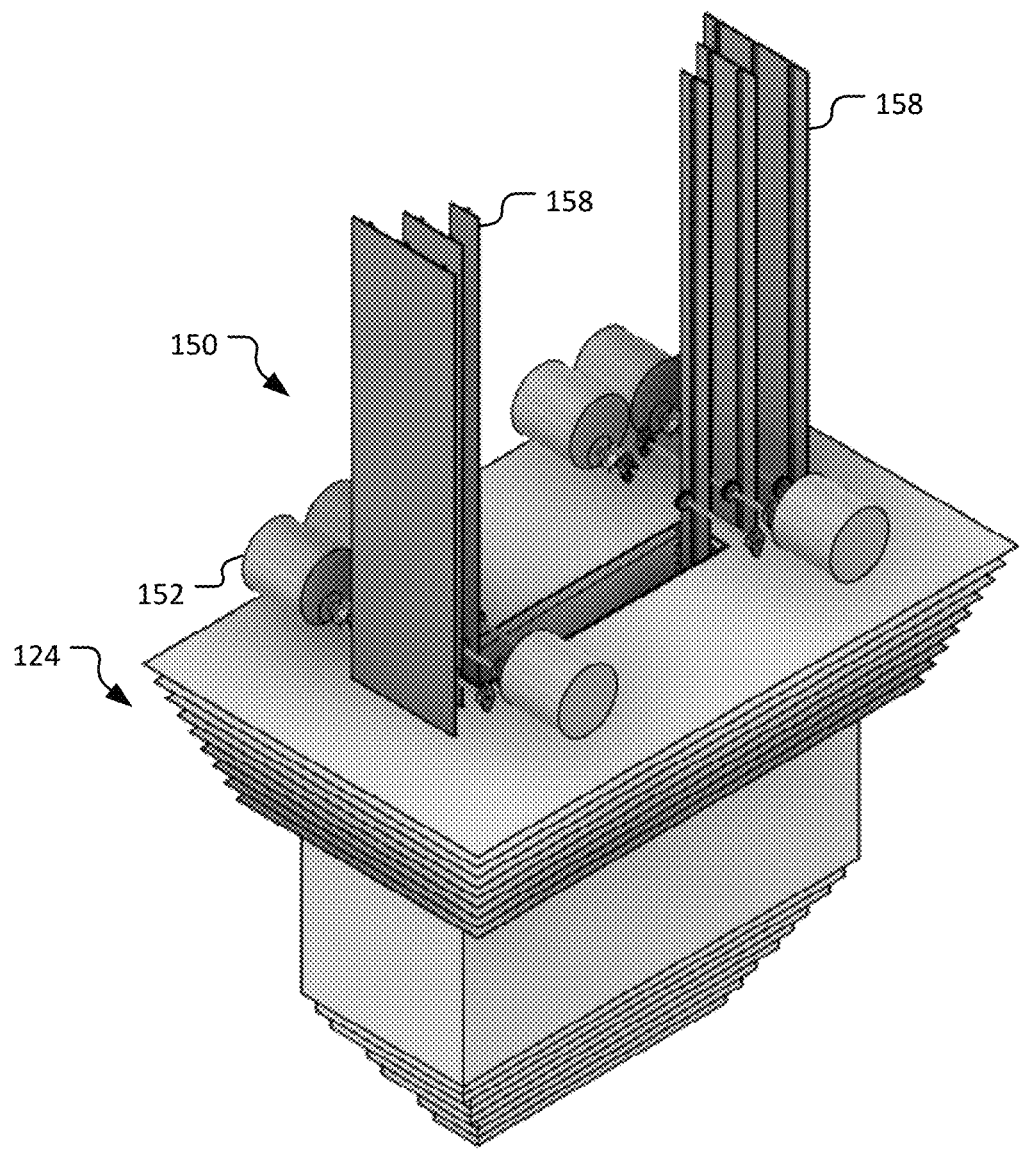
FIG. 20 shows the movable radiant barrier and actuator system of FIG. 17 in a fourth configuration.

Referring to FIG. 20, in the depicted configuration yet another pair of the actuator motors 152 have been activated so as to raise a third grouping of three sheets of the movable portion 124 of the radiant barrier 120. This configuration is also schematically depicted in FIG. 25. It can be seen that now, in this example, all nine layers of sheets of the movable portion 124 have been removed from blocking radiative heat transfer between the thermal energy storage tank 130 and the thermal member 170, and no sheets of the movable portion 124 remain. Accordingly, the resistance to the radiative heat transfer between the thermal energy storage tank 130 and the thermal member 170 is now eliminated. This arrangement can be advantageously used, in some scenarios, to maximize an amount of heat transfer between the thermal energy storage tank 130 and the thermal member 170.

Figure 26:
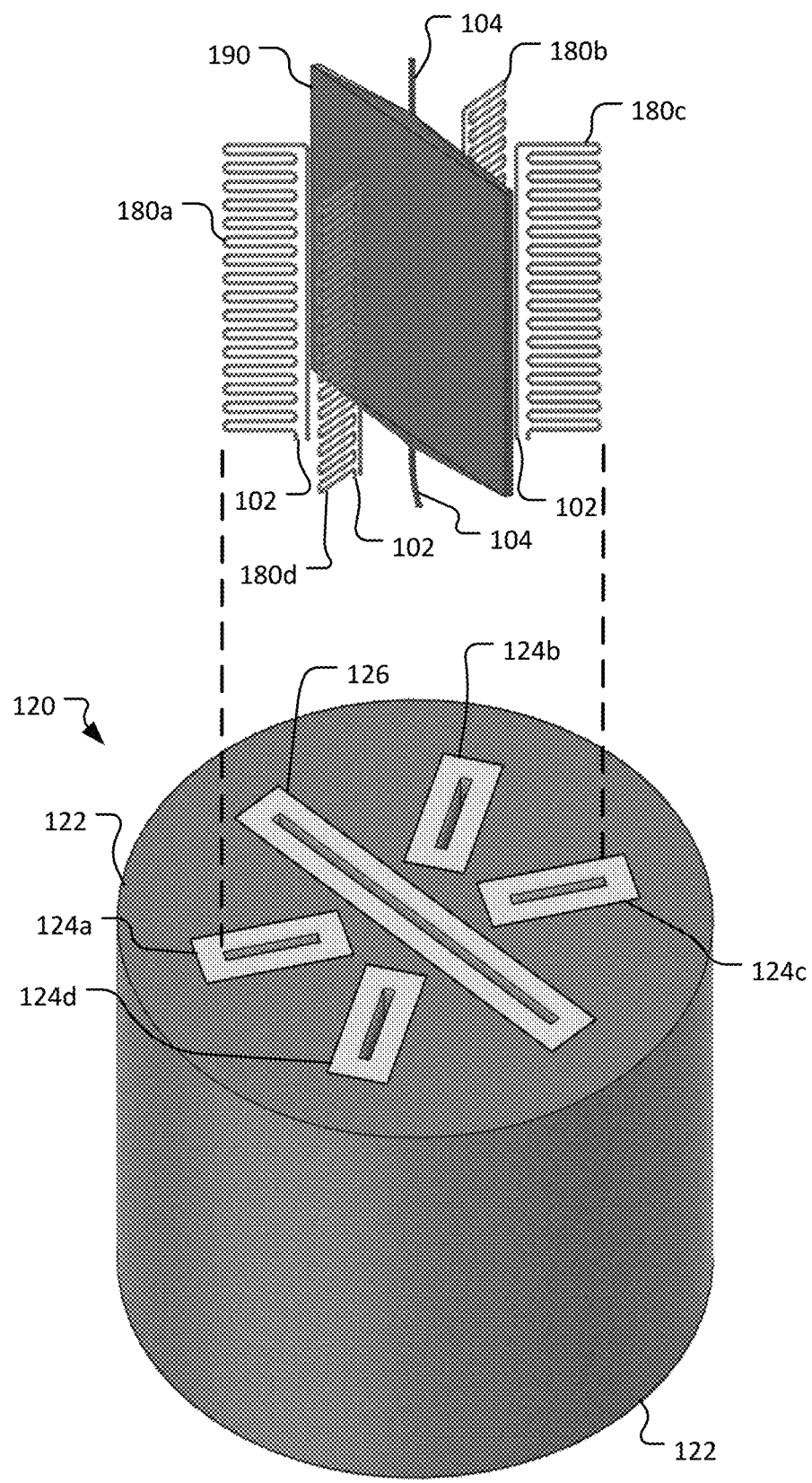
FIG. 26 shows an exploded view of a portion of the HESS of FIG. 1 that includes the radiant barrier, heating devices, and a heating reservoir.
Figure 27:
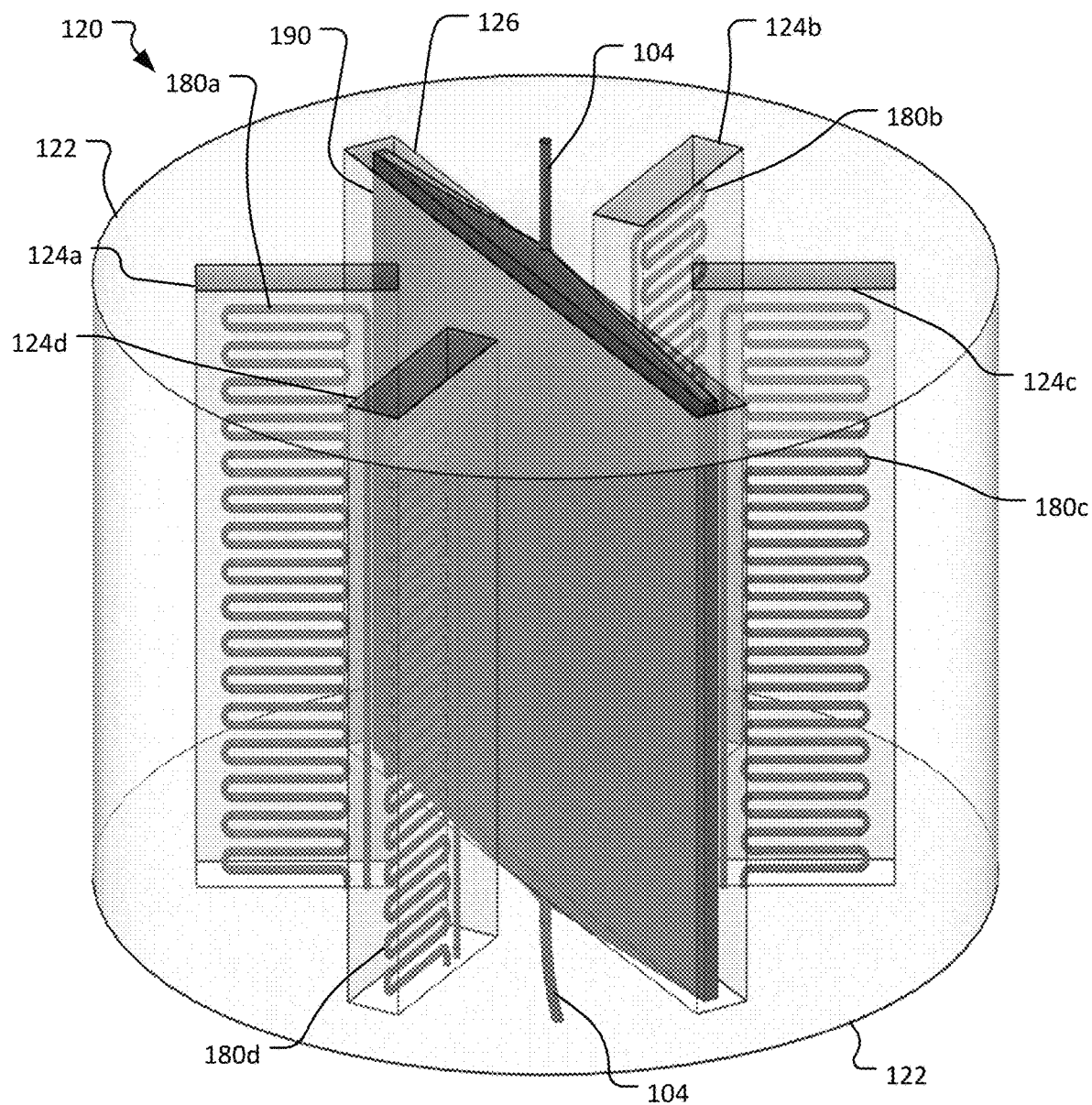
FIG. 27 shows the components of FIG. 26 arranged in an operative configuration and with the radiant barrier being transparent.

FIG. 26 illustrates an exploded view showing the multi-sheet radiant barrier 120 (with its movable portions 124a-d and 126, and stationary portion 122) that is overlaying all of the exterior wall surfaces of the thermal energy storage tank 130 (not visible). Also shown, as an example, are four (4) heating devices 180a-d and a heating reservoir 190. In correspondence with FIG. 1, the heating devices 180a-d have electrical connections 102, and the heating reservoir 190 has working fluid connections 104. Also referring to FIG. 27 (in which the radiant barrier 120 and the thermal energy storage tank 130 are transparent), each of the four heating devices 180a-d is disposed in the confines of a corresponding one of the movable portions 124a-d of the radiant barrier 120, and the heating reservoir 190 is disposed in the confines of the movable portion 126 of the radiant barrier 120. It should be understood that this arrangement is purely exemplary. That is, the HESS 100 can include various other arrangements and/or quantities of heating devices and/or heating reservoirs that are also envisioned within the scope of this disclosure.

Figure 28:
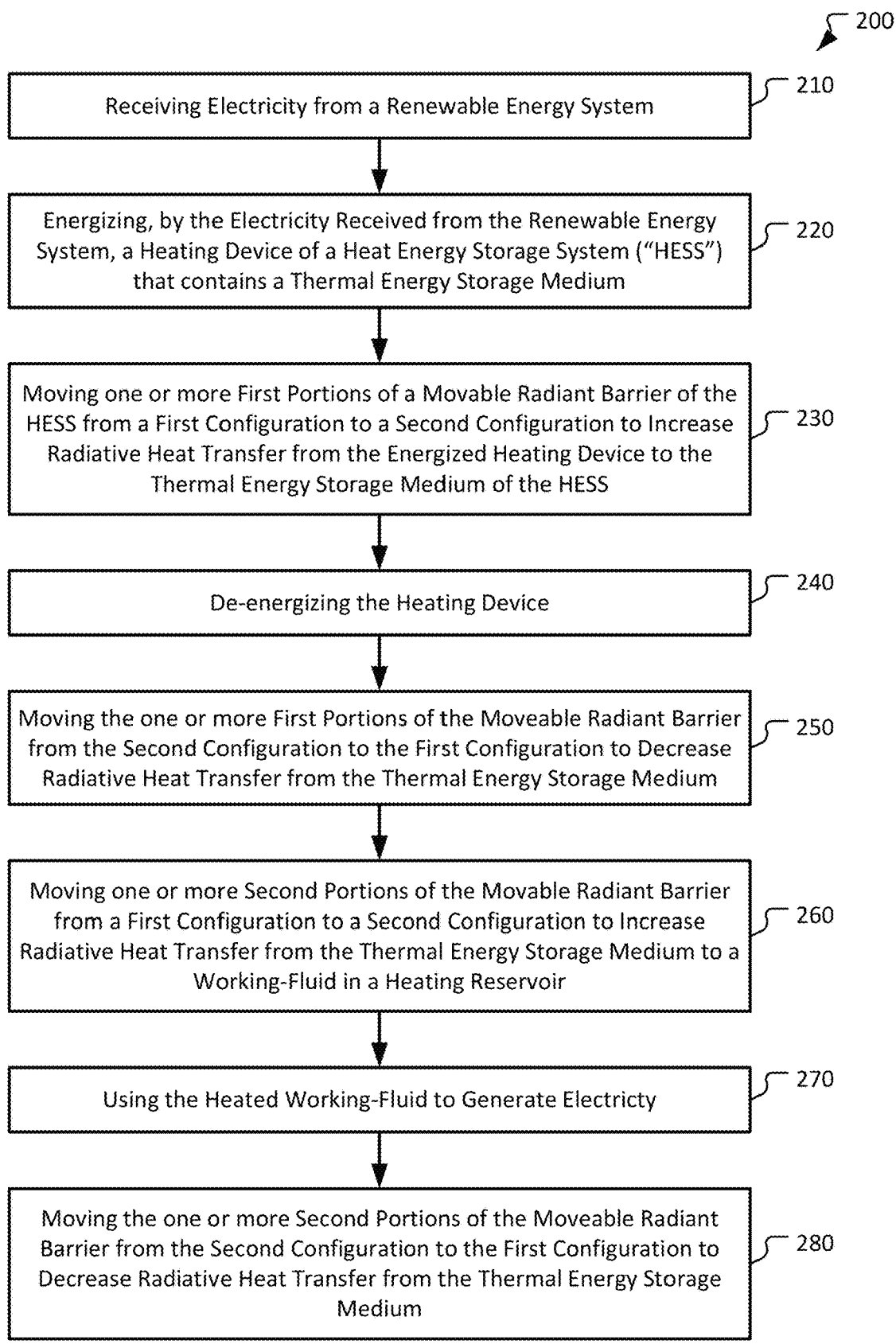
FIG. 28 is a flowchart showing a method of using the HESS of FIG. 1.

FIG. 28 illustrates a method of using an HESS, such as the HESS 100 described herein. At step 210, the HESS receives electricity that is generated by a renewable energy source such as solar panels or wind turbines. At step 220, the electricity from the renewable energy source is used to energize one or more heating devices of the HESS (e.g., one or more of the heating devices 180a-d as described above are energized by the electricity received from the renewable energy source).

At step 230, one or more first portions of a movable radiant barrier of the HESS is/are moved from a first configuration to a second configuration to increase a radiative heat transfer from the energized heating device(s) to a thermal energy storage medium contained within a thermal energy storage tank of the HESS. For example, in the context of the HESS 100 described herein, one or more of the movable portions 124a-d of the radiant barrier 120 are moved away (up) from blocking radiative heat transfer from the energized heating device(s) 180a-d to the thermal energy storage medium 140 contained within the thermal energy storage tank 130.

At step 240, the previously energized heating device is de-energized.

At step 250, after de-energizing the previously energized heating device, the one or more first portions of the movable radiant barrier of the HESS is/are moved from the second configuration back to the first configuration to decrease a radiative heat transfer away from the thermal energy storage medium contained within the thermal energy storage tank of the HESS. For example, in the context of the HESS 100 described herein, one or more of the movable portions 124a-d of the radiant barrier 120 are moved down to block radiative heat transfer from the thermal energy storage medium 140 contained within the thermal energy storage tank 130.

At step 260, one or more second portions of the movable radiant barrier are moved from a first configuration to a second configuration to increase a radiative heat transfer from the thermal energy storage medium to a working fluid in a heating reservoir. For example, in the context of the HESS 100 described herein, the movable portion 126 of the radiant barrier 120 is moved away (up) from blocking radiative heat transfer from the thermal energy storage medium 140 contained within the thermal energy storage tank 130 and the working fluid in the heating reservoir 190.

In step 270, the working fluid is conveyed through the heating reservoir 190 (where it is heated) and then to a steam turbine that is coupled to drive an electricity generator. This can process can generate electricity that can be sent to users when electricity output from renewable energy sources are insufficient for meeting the needs of the users.

In step 280, the one or more second portions of the movable radiant barrier are moved from the second configuration to the first configuration to decrease radiative heat transfer away from the thermal energy storage medium. For example, in the context of the HESS 100 described herein, the movable portion 126 of the radiant barrier 120 is moved down to block radiative heat transfer away from the thermal energy storage medium 140 contained within the thermal energy storage tank 130.

Additional Features and Description

The HESS as described herein is a new energy storage system of extremely good thermal insulation that converts electric energy from renewable energy sources such as solar and wind into thermal energy of hot materials such as hot/molten silicon or hot/molten salts for long term storage of the thermal energy by means of an elaborate thermal insulation system in a vacuum chamber.

The HESS as described herein can be considered to include four major components: (i) a thermal energy storage medium that is contained in a heat resistant thermal energy storage tank made of tungsten, or Molybdenum, stainless steel, or other heat resistant materials with suitable physical properties; (ii) a first heat exchange system which transfers thermal energy of the thermal energy storage medium to a working fluid of a heat engine through non-contact radiative heat transfer from the thermal energy storage tank to the working fluid in a heating reservoir; (iii) a second heat exchange system which transfers heat generated by Ohmic heating devices (resistive heating devices) that are energized with electricity from a renewable energy source (e.g., solar panels or wind turbines) to the thermal energy storage tank through non-contact radiative heat transfer from the Ohmic heating units to the thermal energy storage tank; and (iv) a support structure system which supports weight of the thermal energy storage tank and multiple layers of radiative barrier shielding sheets which enclose the thermal energy storage tank, two heat exchange systems, and other auxiliary components of HESS. A unique and novel feature of support structure of HESS is that it will significantly minimize unavoidable losses of thermal energy of the thermal energy storage tank due to heat conduction through material-to-material direct contacts of the support structure. The HESS described herein can also be synergistically integrated in a hybrid energy storage system that can include a heat engine (with its steam turbine and electricity generator systems) and optionally a FESS (flywheel energy storage system).

Salt stored in a conventional molten salt ESS is heated by Ohmic heating units powered by electricity through direct contact between the Ohmic heating units and molten salt or container of molten salt. Similarly, conventionally a heat exchanger between the hot or molten salt and a working fluid of a heat engine (such as steam turbine) is heated by the molten salt through direct contact between the molten salt and a heat exchanging pipe which carries steam from and to steam turbine. The materials used for heat exchangers are good thermal conductors, and therefore, there is significant loss of thermal energy through heat conduction of the materials of heat exchangers.

Another novel feature of the HESS described herein is that the heat exchange between the thermal energy storage tank and the Ohmic heating units powered by electricity from renewable energy, and heat exchange between the thermal energy storage tank and the working fluid of a heat engine that can generate electricity, are accomplished by no-contact radiative heat transfers in a vacuum between the Ohmic heating unit and the thermal energy storage tank, and between the thermal energy storage tank and heating reservoir containing the working fluid of the heat engine.

Additional key features of the HESS described herein include its extremely good thermal insulation of the thermal energy storage tank, no-contact heat transfer between key components, built-in controllability of the rate of heat exchanges between key components, and the unique and novel support structure which supports and maintains structural integrity of the thermal energy storage tank with minimum losses of heat through conduction through physical contacts of the support structure with the thermal energy storage tank and the radiation shielding sheets of the radiant barrier.

The shape of the thermal energy storage tank of the HESS described herein is topologically a not-so-simple shape. The reason for this not-so-simple topology of shapes of the thermal energy storage tank is to minimize the loss of heat through thermal radiation during process of heat exchange between the thermal energy storage tank and Ohmic heating units, and between the thermal energy storage tank and the heating reservoir. The space in which the transfer of the thermal radiation between the thermal energy storage tank and the Ohmic heating occurs is the narrow confined space of a pass-through hole defined by the thermal energy storage tank. Therefore, there is virtually no loss of energy during the energy exchanging process between the thermal energy storage tank and the Ohmic heating unit to the open space outside of the thermal energy storage tank. In other words, there is no 'leakage' of thermal radiation to an outside open space. This is a beneficial reason for why the thermal energy storage tank has the pass-through holes. This is also a reason why the heating reservoir for the working fluid of the heat engine is located in a pass-through hole of the thermal energy storage tank. These are reasons why the 3D shape of the thermal energy storage tank is topologically quite different from the 3D shapes of conventional containers of molten salt for energy storage.

The sheets of the radiant barrier 'shield' radiative heat transfer from the Ohmic heating unit to the thermal energy storage tank in vacuum. The rate of heat transfer from the Ohmic heating unit to the thermal energy storage tank can be regulated or controlled by controlling the number of sheets of the radiant barrier that are located between the Ohmic heating unit and the thermal energy storage tank. Similarly, the rate of heat transfer from the thermal energy storage tank to the working fluid heating reservoir can be controlled or regulated by controlling the number of sheets of the radiant barrier that are located between the thermal energy storage tank and the heating reservoir.

A novel feature of the HESS described herein is that the number of sheets of the radiant barrier that are located between the thermal energy storage tank and the heating device(s) (Ohmic heating units) and/or working fluid heating reservoir can be readily changed/controlled during the operation of the HESS. In this way, the rate of heat transfer through radiative heat transfer between the thermal energy storage tank and an Ohmic heating unit or between the thermal energy storage tank and a working fluid heating reservoir can be advantageously regulated or controlled (automatically or manually) during operation of the HESS described herein. These features can be employed, for example, to avoid overheating of the working fluid as it passes through the heating reservoir when the temperature of the thermal energy storage tank is too high. For instance, in the case of molten salt, 700° C. may be too high. In case of molten silicon, 1,800° C. may be too high. When the temperature of the thermal energy storage tank is too high, majority of the sheets of a tube of the movable sheets of the radiant barrier should remain in its pass-through hole to attenuate the heat transfer from the thermal energy storage tank to the heating reservoir to avoid overheating of the working fluid. When the temperature of the thermal energy storage tank is too low, a majority or all of the sheets of a tube of the movable sheets of the radiant barrier should be lifted up to increase heat transfer from the thermal energy storage tank to the working fluid in the heating reservoir to avoid under-heating of the working fluid. When the HESS itself is idle, in other words, when the heating of working fluid is not needed, all of the sheets of the movable sheets of the radiant barrier should stay deployed in the pass-through holes of the thermal energy storage tank so that the loss of thermal energy from the thermal energy storage tank via thermal radiation is minimized. This feature can be also be used to avoid overheating of the thermal energy storage tank by the Ohmic heating units. Similarly, when heating of the thermal energy storage tank by the Ohmic heating units is not needed, all of the sheets of the movable sheets of the radiant barrier which enclose the Ohmic heating units will remain in their pass-through holes to minimize any loss of thermal energy of the thermal energy storage tank.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described herein as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various modules and components in the embodiments described herein should not be understood as requiring such separation in all embodiments, and it should be understood that the described components and systems can generally be integrated together in a single product or packaged into multiple products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. An energy storage system comprising:
    a thermal energy storage tank that defines: (i) an enclosed interior space and (ii) an open space extending within the enclosed interior space;
    a thermal energy storage medium located within the enclosed interior space;
    a first heating device disposed in the open space;
    a radiant barrier disposed in the open space; and
    a first actuator system coupled to the radiant barrier,
    wherein the first actuator system is operable to increase a radiative heat transfer from the first heating device to the thermal energy storage medium by at least partially removing the radiant barrier from being disposed in the open space.

2. The energy storage system of claim 1, further comprising a vacuum chamber that contains the thermal energy storage tank.

3. The energy storage system of claim 1, wherein the thermal energy storage tank defines a plurality of open spaces extending within the enclosed interior space.

4. The energy storage system of claim 1, wherein the radiant barrier comprises multiple sheets of material that are spaced apart from the thermal energy storage tank and that are spaced apart from each other.

5. The energy storage system of claim 4, further comprising spacer members disposed between at least some of the multiple sheets of material such that the multiple sheets of material are spaced apart from each other.

6. The energy storage system of claim 5, wherein the spacer members comprise multiple separate portions that are stacked on each other.

7. The energy storage system of claim 1, further comprising a heating reservoir configured to contain a fluid, wherein the heating reservoir is disposed in a second open space of defined by the thermal energy storage tank.

8. The energy storage system of claim 7, further comprising a second actuator system coupled to a second portion of the radiant barrier that is disposed between: (i) the thermal energy storage tank and (ii) the heating reservoir.

9. The energy storage system of claim 8, wherein the second actuator system is operable to increase a radiative heat transfer from the thermal energy storage medium to the fluid contained in the heating reservoir by at least partially removing the second portion of the radiant barrier from being between the thermal energy storage tank and the heating reservoir.

10. The energy storage system of claim 1, wherein a horizontal cross-section of the thermal energy storage tank has an outer profile that is circular or polygonal.

11. The energy storage system of claim 1, wherein the thermal energy storage medium comprises salt or silicon.

12. The energy storage system of claim 1, wherein the first heating device comprises a resistive heating element.

13. The energy storage system of claim 1, wherein portions of the radiant barrier that are not disposed within the open space are configured to be stationary in relation to the thermal energy storage tank.

14. The energy storage system of claim 1, wherein the radiant barrier comprises at least two sheets of material that are spaced apart from the thermal energy storage tank and that are spaced apart from each other.

15. A method of storing energy, the method comprising:
delivering electrical energy to energize one or more resistive heating devices that are each disposed in a respective open space of one or more open spaces defined by exterior surfaces of a thermal energy storage tank, wherein the exterior surfaces of the thermal energy storage tank also define an enclosed interior space containing a thermal energy storage medium, and wherein, prior to the delivering of the electrical energy to energize the one or more resistive heating devices, a movable radiant barrier is disposed over at least some of the exterior surfaces of the thermal energy storage tank that define the one or more open spaces;
delivering a fluid to a heating reservoir disposed in an additional open space of the one or more open spaces defined by the thermal energy storage tank; and
moving an additional portion of the movable radiant barrier at least partially out of the additional open space to increase a radiative heat transfer from the thermal energy storage medium to the fluid.

16. The method of claim 15, further comprising moving one or more portions of the movable radiant barrier to increase a radiative heat transfer from the energized one or more resistive heating devices to the thermal energy storage medium.

17. The method of claim 15, further comprising, after the delivering electrical energy to energize one or more resistive heating devices, moving the one or more portions of the movable radiant barrier back over the at least some of the exterior surfaces of the thermal energy storage tank to decrease a radiative heat transfer away from the thermal energy storage medium.

18. The method of claim 15, further comprising, after heating the fluid by the radiative heat transfer from the thermal energy storage medium, moving the additional portion of the movable radiant barrier back into the additional open space to decrease a radiative heat transfer away from the thermal energy storage medium.

* * * * *